US008482518B2

(12) United States Patent
Kohara et al.

(10) Patent No.: US 8,482,518 B2
(45) Date of Patent: Jul. 9, 2013

(54) INPUT APPARATUS AND IMAGE FORMING APPARATUS

(75) Inventors: Tasuku Kohara, Kanagawa (JP); Kenichi Yamada, Kanagawa (JP); Kazuo Koike, Kanagawa (JP); Taisuke Omi, Kanagawa (JP); Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 882 days.

(21) Appl. No.: 12/475,865

(22) Filed: Jun. 1, 2009

(65) Prior Publication Data

US 2009/0316193 A1 Dec. 24, 2009

(30) Foreign Application Priority Data

Jun. 18, 2008 (JP) .................. 2008-158740

(51) Int. Cl.
*G06F 3/01* (2006.01)
(52) U.S. Cl.
USPC .......................................... 345/156; 345/168
(58) Field of Classification Search
USPC ................... 345/156–158, 168, 169
See application file for complete search history.

(56) References Cited

U.S. PATENT DOCUMENTS

| 5,640,467 | A | | 6/1997 | Yamashita et al. |
| 5,889,510 | A | * | 3/1999 | Klarlund ................ 345/168 |
| 5,987,227 | A | | 11/1999 | Endo et al. |
| 6,226,102 | B1 | | 5/2001 | Koike et al. |
| 6,727,489 | B2 | * | 4/2004 | Yano |
| 6,832,010 | B2 | | 12/2004 | Miyazaki et al. |
| 7,382,938 | B2 | | 6/2008 | Kizaki et al. |
| 7,502,141 | B2 | | 3/2009 | Kowada et al. |
| 7,518,742 | B2 | | 4/2009 | Toyonori et al. |
| 7,537,205 | B2 | | 5/2009 | Nagata et al. |
| 8,085,409 | B2 | * | 12/2011 | Aso et al. |
| 2002/0057386 | A1 | * | 5/2002 | Otera |
| 2005/0253807 | A1 | * | 11/2005 | Hohmann et al. ............ 345/156 |
| 2006/0101349 | A1 | * | 5/2006 | Lieberman et al. .......... 345/168 |
| 2006/0197920 | A1 | * | 9/2006 | Furui et al. |
| 2007/0059032 | A1 | | 3/2007 | Yamada et al. |
| 2007/0212101 | A1 | | 9/2007 | Koike et al. |

(Continued)

FOREIGN PATENT DOCUMENTS

| JP | 11-119909 | 4/1999 |
| JP | 2004-302307 | 10/2004 |

(Continued)

OTHER PUBLICATIONS

U.S. Appl. No. 12/430,556, filed Apr. 27, 2009, Kohara, et al.

(Continued)

*Primary Examiner* — Regina Liang
(74) *Attorney, Agent, or Firm* — Oblon, Spivak, McClelland, Maier & Neustadt, L.L.P.

(57) ABSTRACT

An input apparatus for a user to input an instruction into a body apparatus is disclosed. The input apparatus includes: a projection unit configured to project images of a plurality of virtual keys onto a projection area on a floor surface; a position detection unit configured to detect position information of a foot of the user put on the projection area; and a key detection unit configured to detect a virtual key corresponding to a position of the foot of the user from among the virtual keys based on information on the images of the virtual keys and a result of detection by the position detection unit.

18 Claims, 22 Drawing Sheets

U.S. PATENT DOCUMENTS

| | | |
|---|---|---|
| 2008/0089017 A1 | 4/2008 | Yamada et al. |
| 2008/0199201 A1 | 8/2008 | Kohara et al. |
| 2008/0307329 A1 | 12/2008 | Endoh |
| 2009/0060612 A1 | 3/2009 | Kohara et al. |
| 2009/0066644 A1 | 3/2009 | Endoh et al. |
| 2009/0102110 A1 | 4/2009 | Endoh et al. |

FOREIGN PATENT DOCUMENTS

| | | | |
|---|---|---|---|
| JP | 2005-10394 | | 1/2005 |
| JP | 2005-241719 | | 9/2005 |
| JP | 2007-219966 | * | 8/2007 |
| JP | 2009-279193 | | 12/2009 |

OTHER PUBLICATIONS

Office Action issued Apr. 23, 2012 in Japanese Patent Application No. 2008-158740.

* cited by examiner

FOOT SWITCH

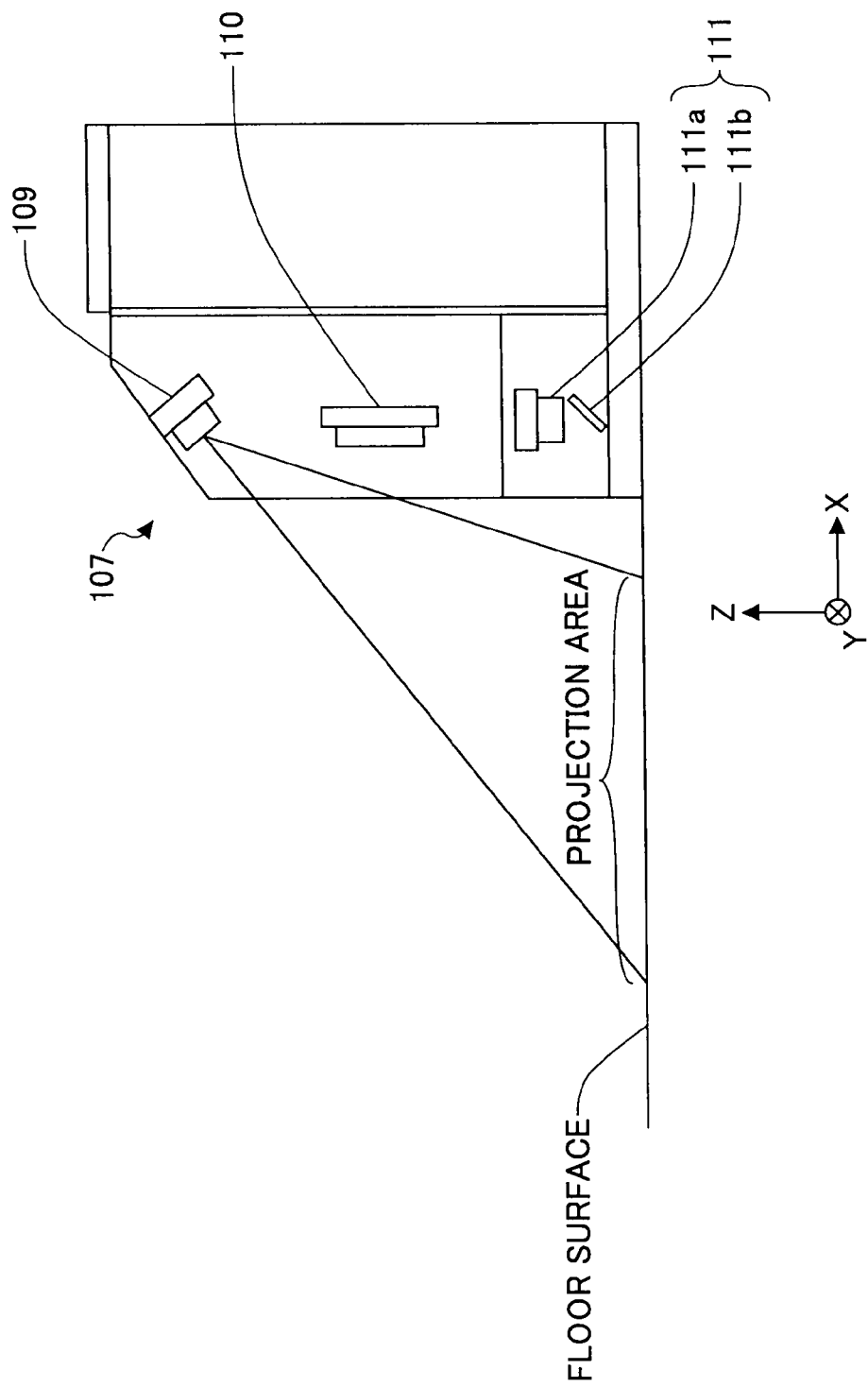

FIG.7A
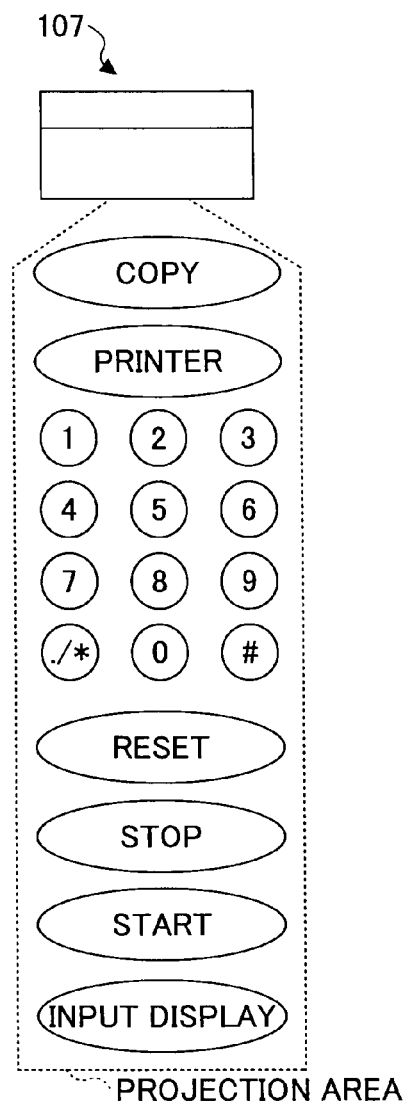
FIG.7B
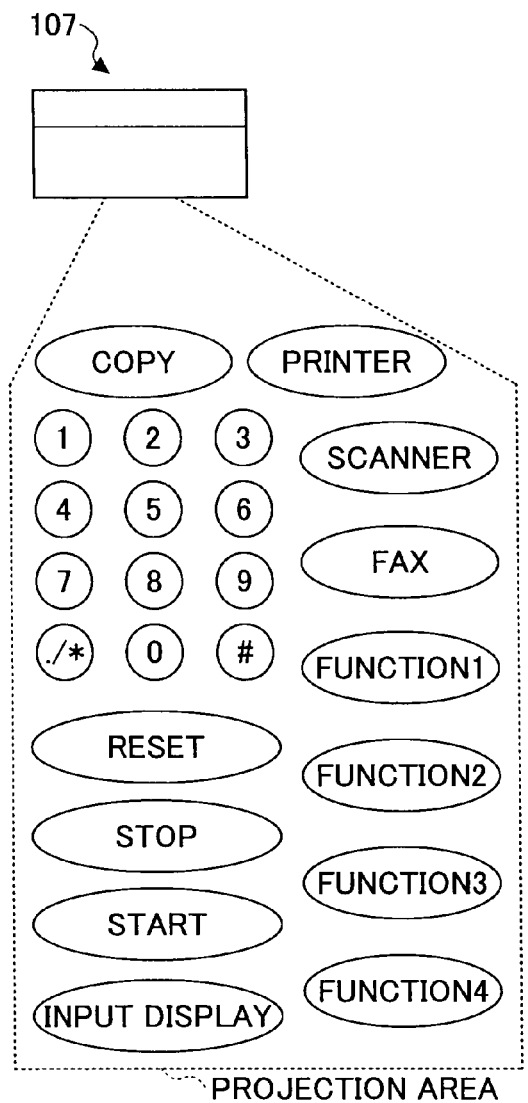
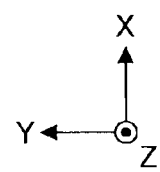
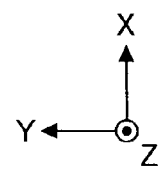

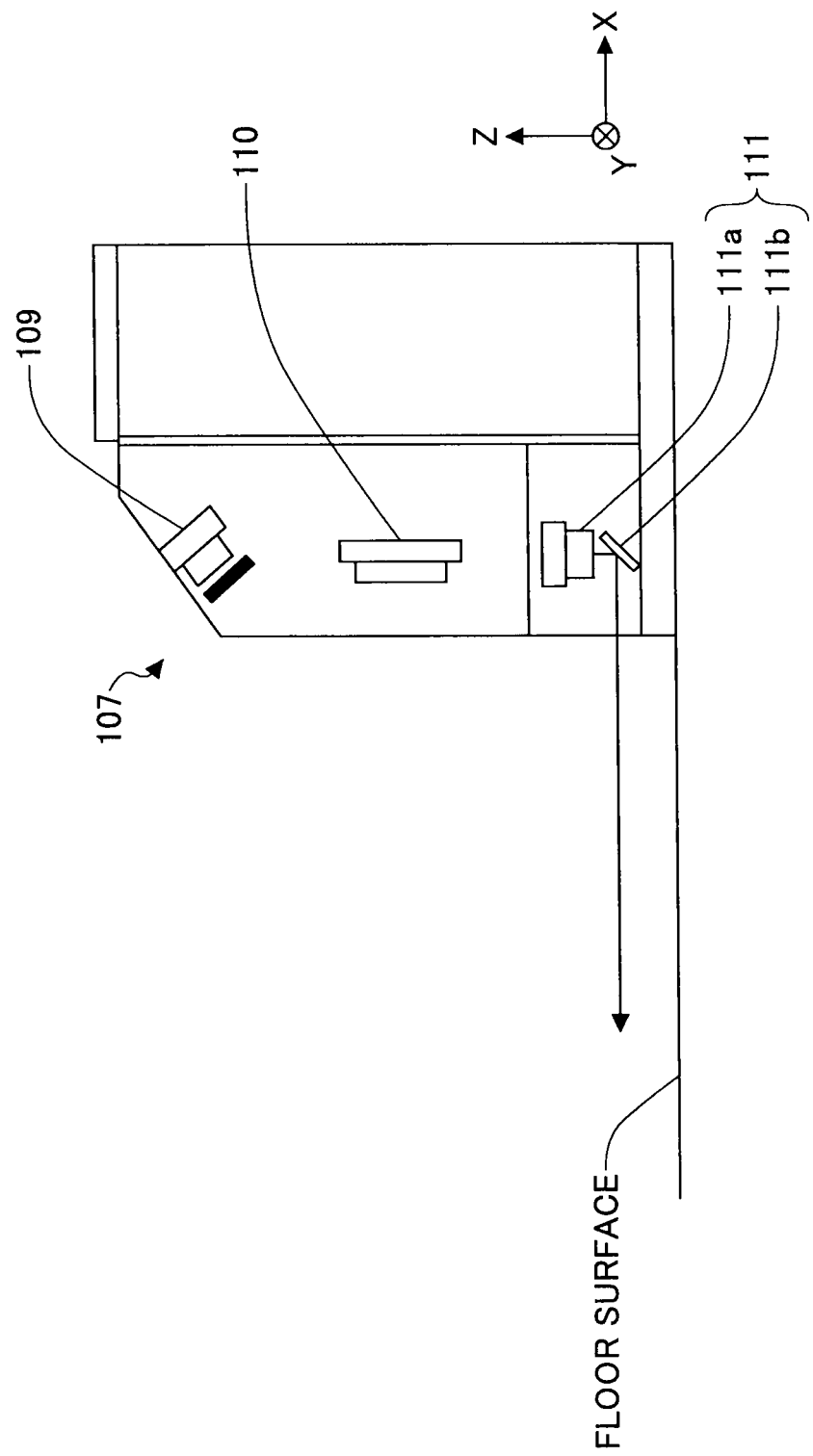

INPUT APPARATUS AND IMAGE FORMING APPARATUS

BACKGROUND OF THE INVENTION

1. Field of the Invention

The present invention relates to an input apparatus and an image forming apparatus. More particularly, the present invention relates to an input apparatus for a user to input an instruction to a body apparatus, and relates to an image forming apparatus having the input apparatus.

2. Description of the Related Art

An image forming apparatus such as a copy machine and a printer is provided with a plurality of input keys for inputting an instruction for executing a job by a user, and an operation panel having a display part for displaying a state of the image forming apparatus and various messages for the user.

For example, Japanese Laid-Open Patent Application No. 2005-010394 discloses an image forming apparatus for obtaining optimal work positions according to physical information of the user such as height of the user and use or non-use of wheelchair so as to move up or down an operation part including an operation panel and an output tray together.

However, since the input key has a mechanical structure, there is a possibility that frequently used keys break down. In such a case, it is necessary to replace the whole of the operation panel.

Japanese Laid-Open Patent Application No. 2007-219966 discloses a projection input apparatus that can project a keyboard having a proper size even when placement conditions such as projection distances are different, and discloses an information terminal including the projection input apparatus.

In addition, a foot switch can be added to a conventional image forming apparatus as an option (refer to FIG. 1)

Recent image forming apparatuses has multiple functions, and has various input menus. Thus, there is a problem in that operability is degraded when the projection input apparatus of the Japanese Laid-Open Patent Application No. 2007-219966 is used for an image forming apparatus.

In addition, in recent years, desires for hands-free operation when a user inputs instructions for executing a job are appearing.

However, functions of the conventional foot switch are limited, and the conventional foot switch is a subordinate part to the operation panel. In addition, the conventional foot switch also has a mechanical structure, when the foot switch is used frequently, there is a fear that it may brake down.

SUMMARY OF THE INVENTION

The present invention is contrived under these circumstances, and a first object of the present invention is to provide an input apparatus that has superior durability and operability and that can free user's hands when inputting data.

A second object of the present invention is to provide an image forming apparatus having superior durability and operability.

According to an embodiment of the present invention, an input apparatus for a user to input an instruction into a body apparatus is provided. The input apparatus includes:

a projection unit configured to project images of a plurality of virtual keys onto a projection area on a floor surface;

a position detection unit configured to detect position information of a foot of the user put on the projection area; and a key detection unit configured to detect a virtual key corresponding to a position of the foot of the user from among the virtual keys based on information on the images of the virtual keys and a result of detection by the position detection unit.

According to the input apparatus, durability and operability can be improved, and user's both hands can be left to be free when performing key input.

According to another embodiment of the present invention, an image forming apparatus for forming an image based on an instruction input by a user is provided. The image forming apparatus includes: an input apparatus; and a body apparatus configured to form an image based on the instruction input from the input apparatus. The input apparatus includes:

a projection unit configured to project images of a plurality of virtual keys onto a projection area on a floor surface;

a position detection unit configured to detect position information of a foot of the user put on the projection area; and a key detection unit configured to detect a virtual key corresponding to a position of the foot of the user from among the virtual keys based on information on the images of the virtual keys and a result of detection by the position detection unit.

According to the image forming apparatus, durability and operability can be improved.

BRIEF DESCRIPTION OF THE DRAWINGS

Other objects, features and advantages of the present invention will become more apparent from the following detailed description when read in conjunction with the accompanying drawings, in which:

FIG. 6 is a diagram for explaining working of the projection apparatus;

FIGS. 7A and 7B are diagrams for explaining the projection area and the virtual key images;

FIGS. 8A and 8B are diagrams for explaining working of the infrared apparatus;

DETAILED DESCRIPTION OF THE PREFERRED EMBODIMENTS

Figure 1:
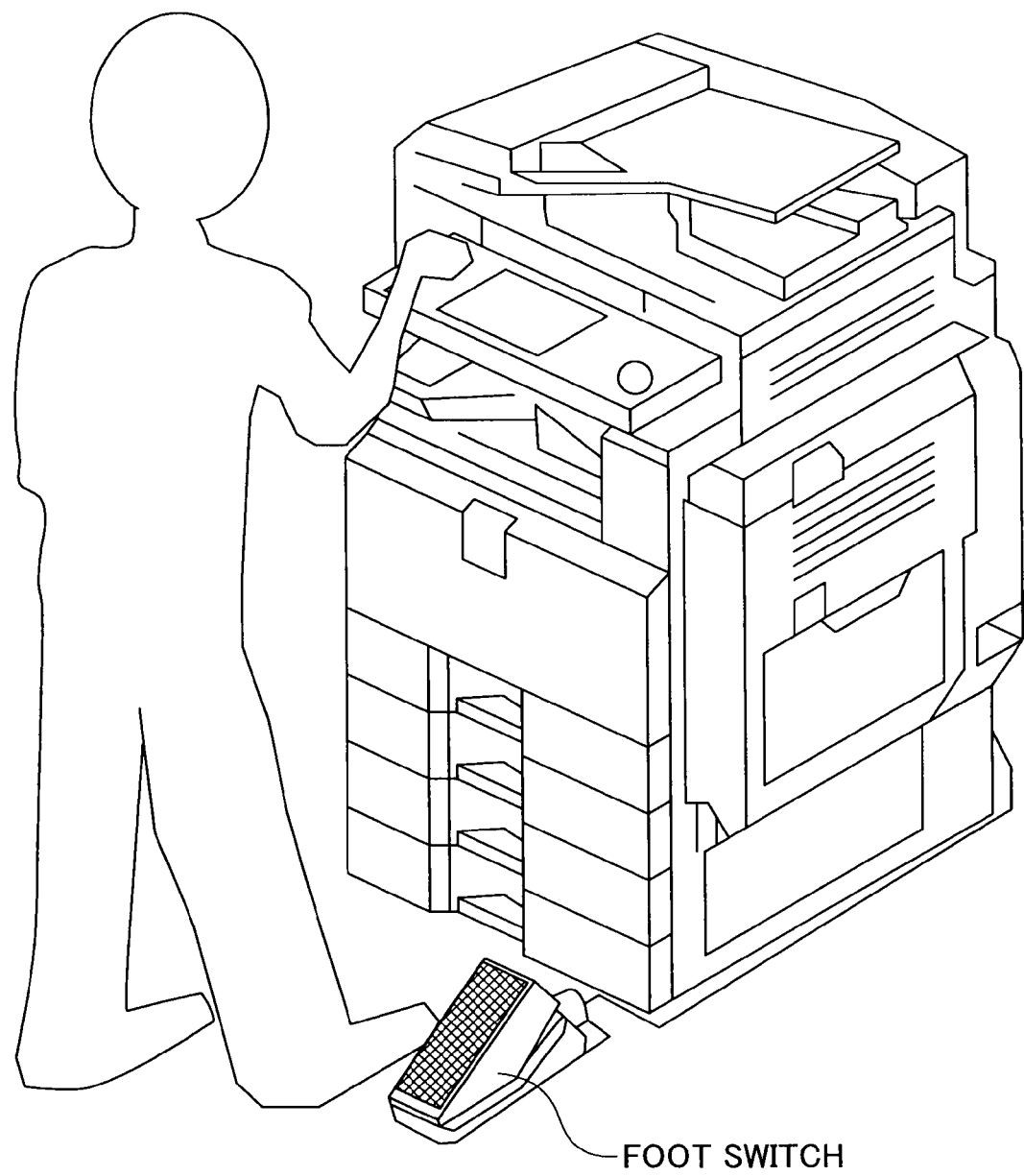
FIG. 1 is a diagram for explaining a conventional foot switch.
Figure 2:
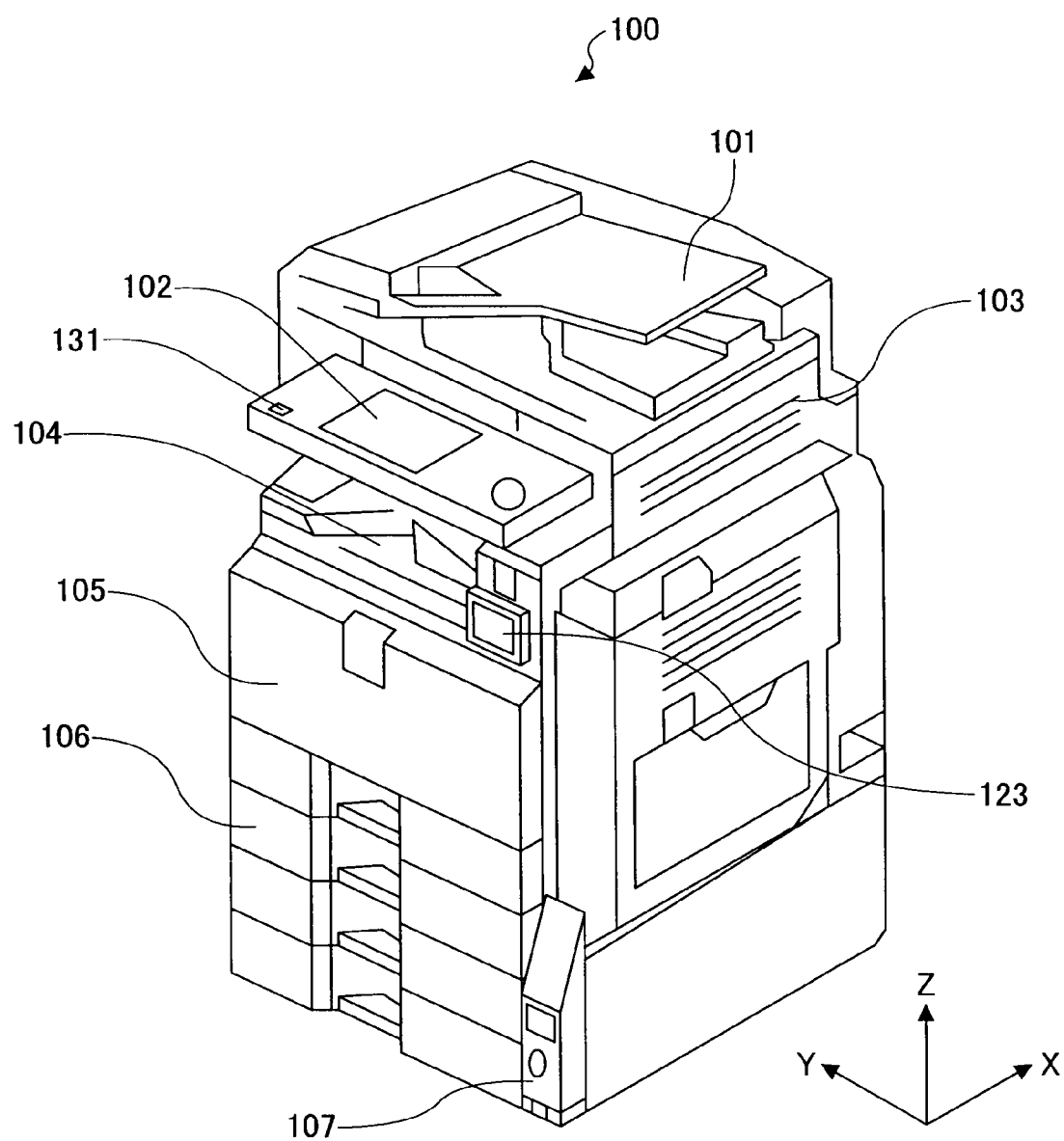
FIG. 2 is a diagram of an external view of a multifunction machine of an embodiment of the present invention.
Figure 3:
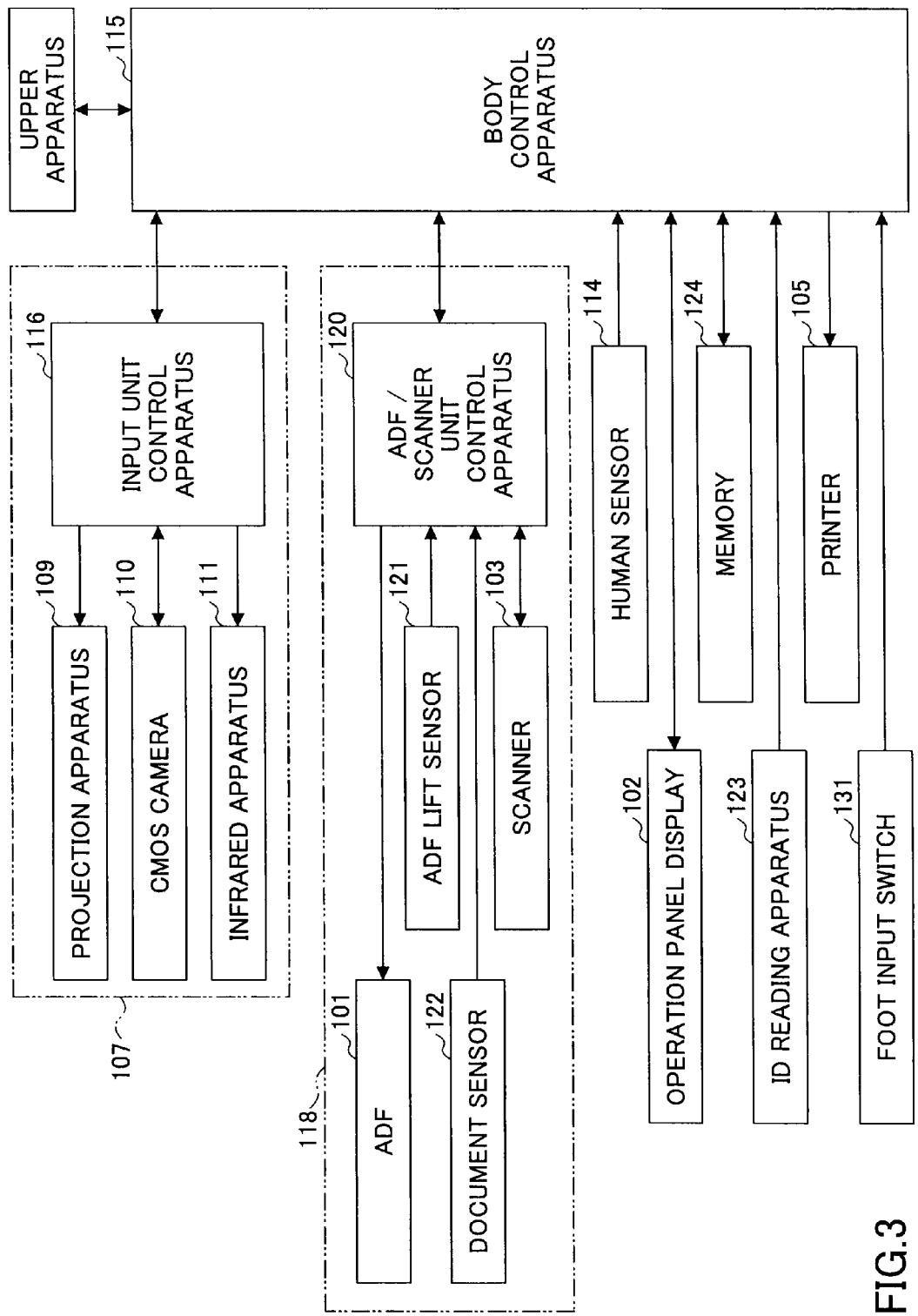
FIG. 3 is a block diagram for explaining control relationship in the multifunction machine shown in FIG. 2.

In the following, embodiments of the present invention are described with reference to FIGS. 2-18. FIG. 2 shows an external view of a multifunction machine 100 as an image forming apparatus of an embodiment. In addition, FIG. 3 shows a block diagram representing control relationship in the multifunction machine 100. Arrows shown in FIG. 3 indicate flows of representative signals and information, but do not indicate all of connection relations of each block.

The multifunction machine 100 includes an input unit 107, an ADF/scanner unit 118, a printer 105, a paper tray 106, an output tray 104, a human sensor 114, an operation panel display 102, an ID reader 123, a memory 124, a foot input switch 131, and a body control apparatus 115.

The input unit 107 includes a projection apparatus 109, a CMOS camera 110, an infrared apparatus 111, and an input unit control apparatus 116.

In addition, the ADF/scanner unit 118 includes an auto document feeder (to be referred to as ADF hereinafter) 101, an ADF lift sensor 121, a document sensor 122, a scanner 103, an ADF/scanner unit control apparatus 120.

The ADF 101 is placed at an uppermost position of the multifunction machine 100 (end part of the side of +Z) in an upper side (the side of +Z) of the scanner. The ADF 101 includes a document setting unit on which a plurality of documents can be set, so that the ADF 101 carries the documents one by one to the upper surface (glass surface) of the scanner 103.

The document sensor 122 is a sensor for detecting whether a document is set on the document setting unit of the ADF 101. An output signal of the document sensor 122 is provided to the ADF/scanner unit control apparatus 120.

The ADF 101 can be separated from the scanner 103. More particularly, only the end part of the +X side of the ADF 101 is fixed, so that the ADF 101 can be rotated around the end part of the +X side by lifting the end part of the −X side of the ADF 101. Thus, for example, for copying a bound document, the document can be put on an upper surface (glass surface) of the scanner 103 by separating the ADF 101 from the scanner 103.

The ADF lift sensor 121 is a sensor for detecting whether the ADF 101 is separated from the scanner 103, that is, detecting whether the ADF 101 is lifted. An output signal of the ADF lift sensor 121 is supplied to the ADF/scanner unit control apparatus 120.

The ADF/scanner unit control apparatus 120 controls the ADF 101 and the scanner 103 based on the output signal of the document sensor 122, an output signal of the ADF lift sensor 121, and an instruction of the body control apparatus 115.

The scanner 103 reads image information of the document put on the upper surface (glass surface). When the multifunction machine 100 functions as a copy machine, the read image information is sent to the printer 105. At this time, the image information may be directly sent from the scanner 103 to the printer 105, or may be sent to the printer 105 via the ADF/scanner unit control apparatus 120 or the body control apparatus 115. In addition, when the multifunction machine 100 functions as a scanner machine, the read image information is stored in the memory 124. At this time, the image information may be directly sent from the scanner 103 to the memory 124, or may be sent to the memory 124 via the ADF/scanner unit control apparatus 120 or the body control apparatus 115.

The human sensor 114 is a sensor detecting whether a human is standing in front of the multifunction machine 100 (in the −X side). An output signal of the human sensor 114 is supplied to the body control apparatus 115.

The operation panel display 102 displays various messages and the like based on instructions of the body control apparatus 115.

The foot input switch 131 is placed near the operation panel display 102, and it is switched ON and OFF by a user. The ON/OFF information of the foot input switch 131 is reported to the body control apparatus 115.

The ID reading apparatus 123 is used for a user to input a user ID. When the user ID is input, the user ID is reported to the body control apparatus 115. The user ID may be input using a key input scheme, or may be input using a contact or noncontact IC card reading scheme by a card reader.

The memory 124 stores user information including information on virtual keys for each user ID.

The paper tray 106 stores print papers.

The printer 105 obtains a print paper from the paper tray 106. When the multifunction machine 100 functions as a copy machine, the printer 105 prints image information read by the scanner 103. When the multifunction machine 100 functions as a printer machine, the printer 105 prints image information from an upper apparatus (personal computer, for example).

The output tray 104 holds the print paper on which image information has been printed by the printer 105.

Figure 4:
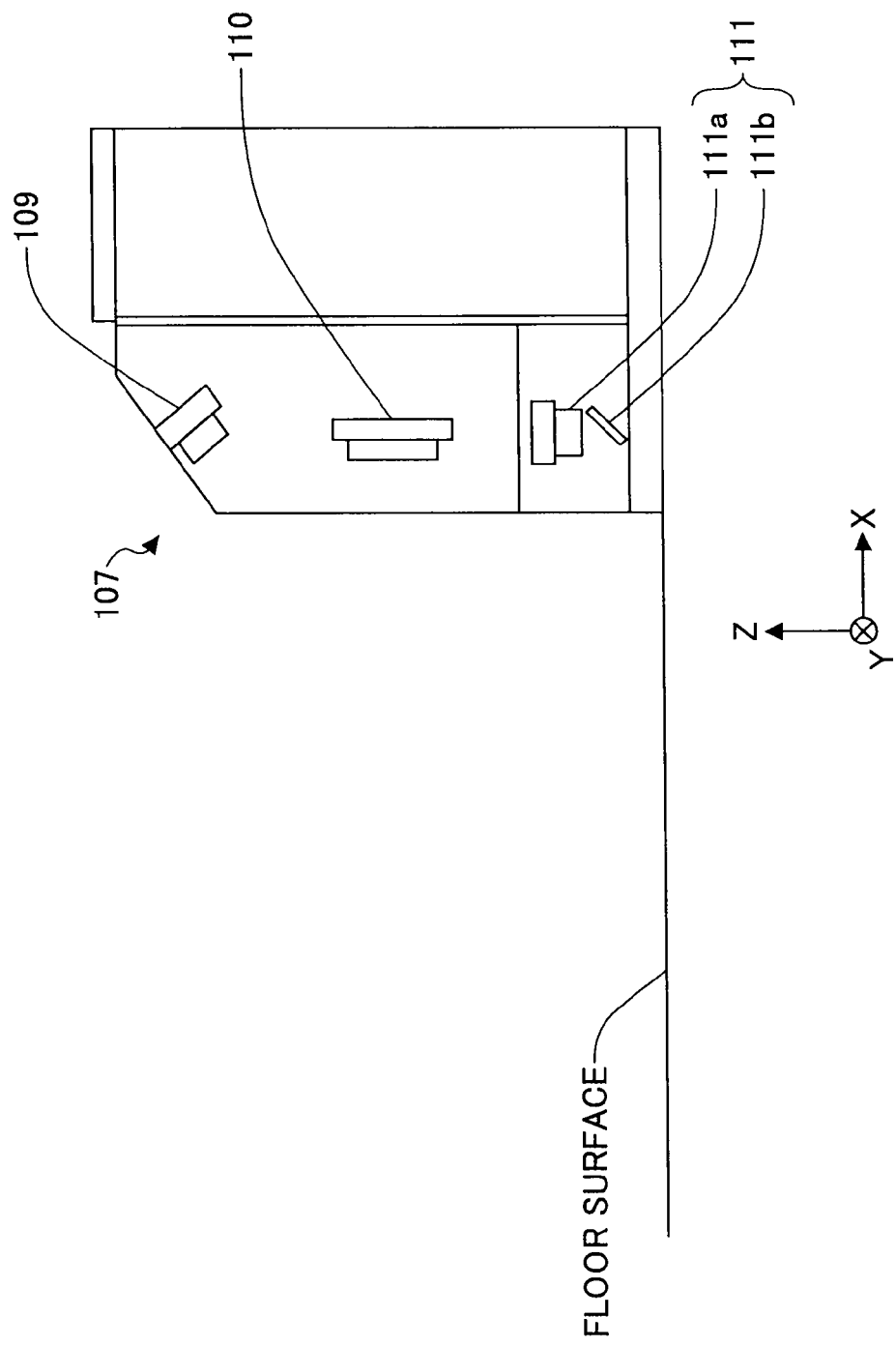
FIG. 4 is a diagram for explaining an input unit.

The input unit 107 is placed at a lower end of the front side (−X side) of the multifunction machine 100. In this embodiment, for example, as shown in FIG. 4, the projection apparatus 109, the CMOS camera 110, and the infrared apparatus 111 are mounted in a cabinet according to predetermined position relationship.

The projection apparatus 109 is placed at the end part of the +Z side in the cabinet, and includes a projector 109a for projecting virtual key images on the floor.

Figure 5:
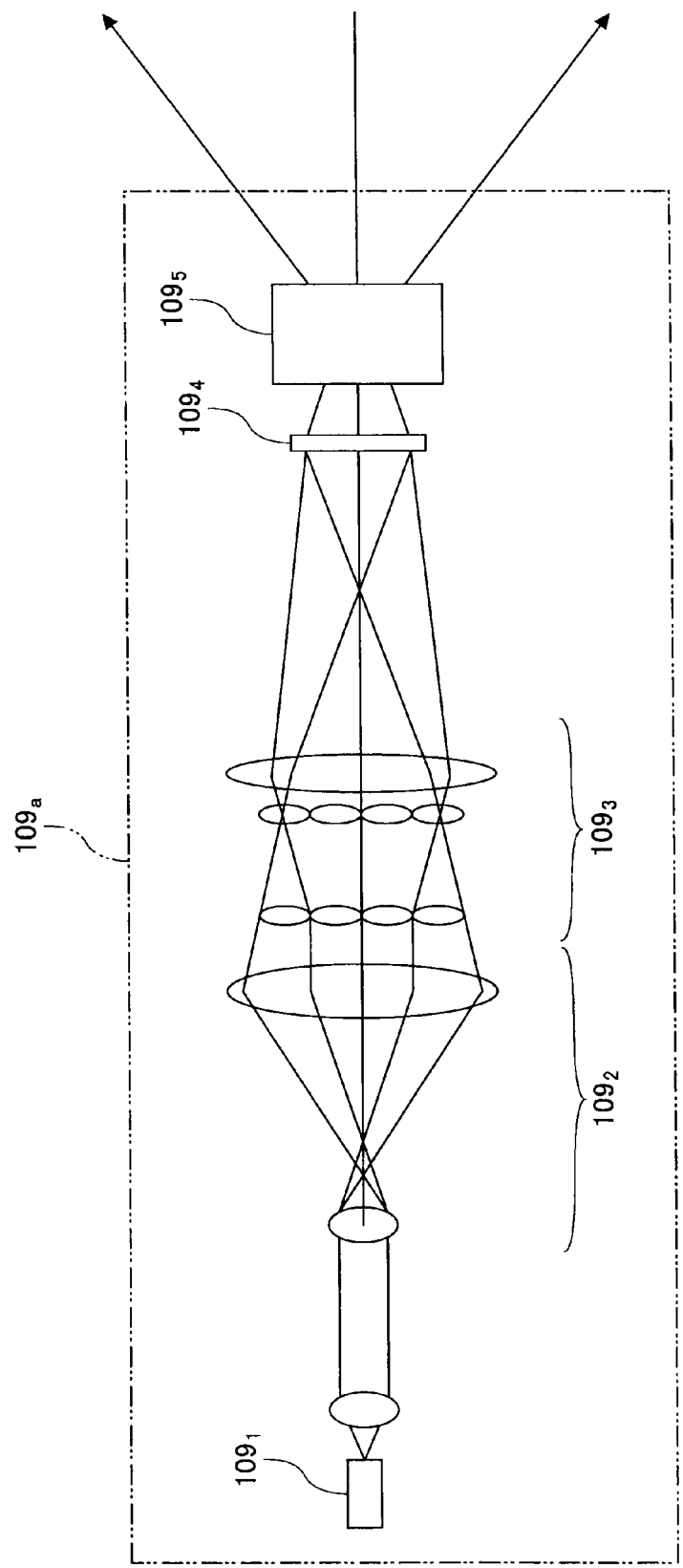
FIG. 5 is a diagram for explaining a projector.

As shown in FIG. 5, for example, the projector 109a includes a light source apparatus $109_1$, a collimate optical system $109_2$, an integrator optical system $109_3$, a liquid crystal panel $109_4$, a projection lens $109_5$, and an iris mechanism (not shown in the figure).

The light output from the light source apparatus $109_1$ enters the liquid crystal panel $109_4$ via the collimate optical system $109_2$ and the integrator optical system $109_3$.

The light entering the liquid crystal panel $109_4$ is modulated according to projection image data, and is enlarged and projected on the floor by the projection lens $109_5$. The liquid crystal panel $109_4$ is a color liquid crystal panel.

The iris mechanism includes a plurality of irises in which sizes of the apertures are different with each other. The iris mechanism inserts a proper iris into the light path (after the projection lens $109_5$, for example) according to the size of the area (to be referred to as "projection area" hereinafter) on the floor on which the virtual key image is projected.

Each optical system is adjusted such that distortion and blurring are reduced in the image projected on the floor.

FIG. 6 shows a projection area. FIG. 7A shows an example of a projected virtual key image.

Each virtual key in the virtual key image shown in FIG. 7A has a meaning the same as that of the input key in a conventional multifunction machine. For example, "Copy" is a virtual key that instructs the multifunction machine to function as a copy machine, and "Printer" is a virtual key that instructs the multifunction machine to function as a printer machine. "Reset" is a virtual key for instructing cancelling of data input so far, "Start" is a virtual key for instructing operation start, and "Stop" is a virtual key for instructing stop of operation. In addition, "0"-"9", "./*", "#" are virtual keys corresponding to numeric keypads.

FIG. 7B shows an example of a virtual key image when the projection area is enlarged.

In this example, "Scanner" is a virtual key that instructs the multifunction machine to function as a scanner machine, and "Fax" is a virtual key that instructs the multifunction machine to function as a fax machine. "Function 1"-"Function 4" are virtual keys for a document box and login/logout.

In the following, virtual keys for setting functions such as "Copy", "Printer", "Scanner", and "Fax" are also called function setting keys. In addition, virtual keys for indicating operation such as "Start" and "Stop" are also called operation keys.

In addition, in this example, the projection area is set such that the longer direction becomes the X axis direction.

Figure 8B:
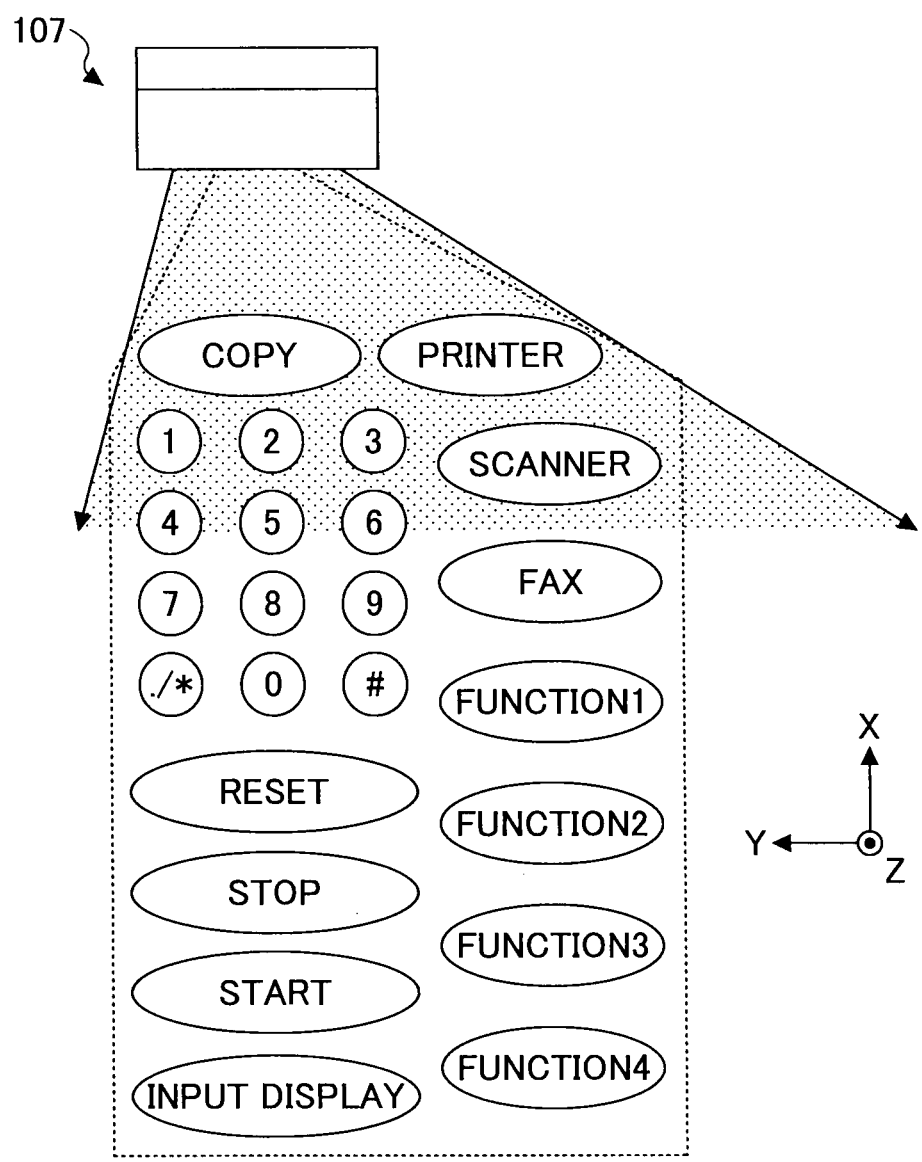

The infrared apparatus 111 is placed at an end part of –Z side in the cabinet, and includes a light source 111a for ejecting infrared light and a reflection mirror 111b for bending a light path of the infrared light ejected from the light source 111a. As shown in FIG. 8A, after the infrared light is emitted in –Z direction from the light source 111a, the light path is bent to –X direction by the reflection mirror 111b. Since the infrared light emitted from the light source 111a is divergent light, the infrared light output from the input unit 107 goes over the space near the floor surface while being expanded in the direction parallel to the floor surface. In this example, as shown in FIG. 8B, the infrared light output from the input unit 107 covers almost all of the projection area.

Figure 9:
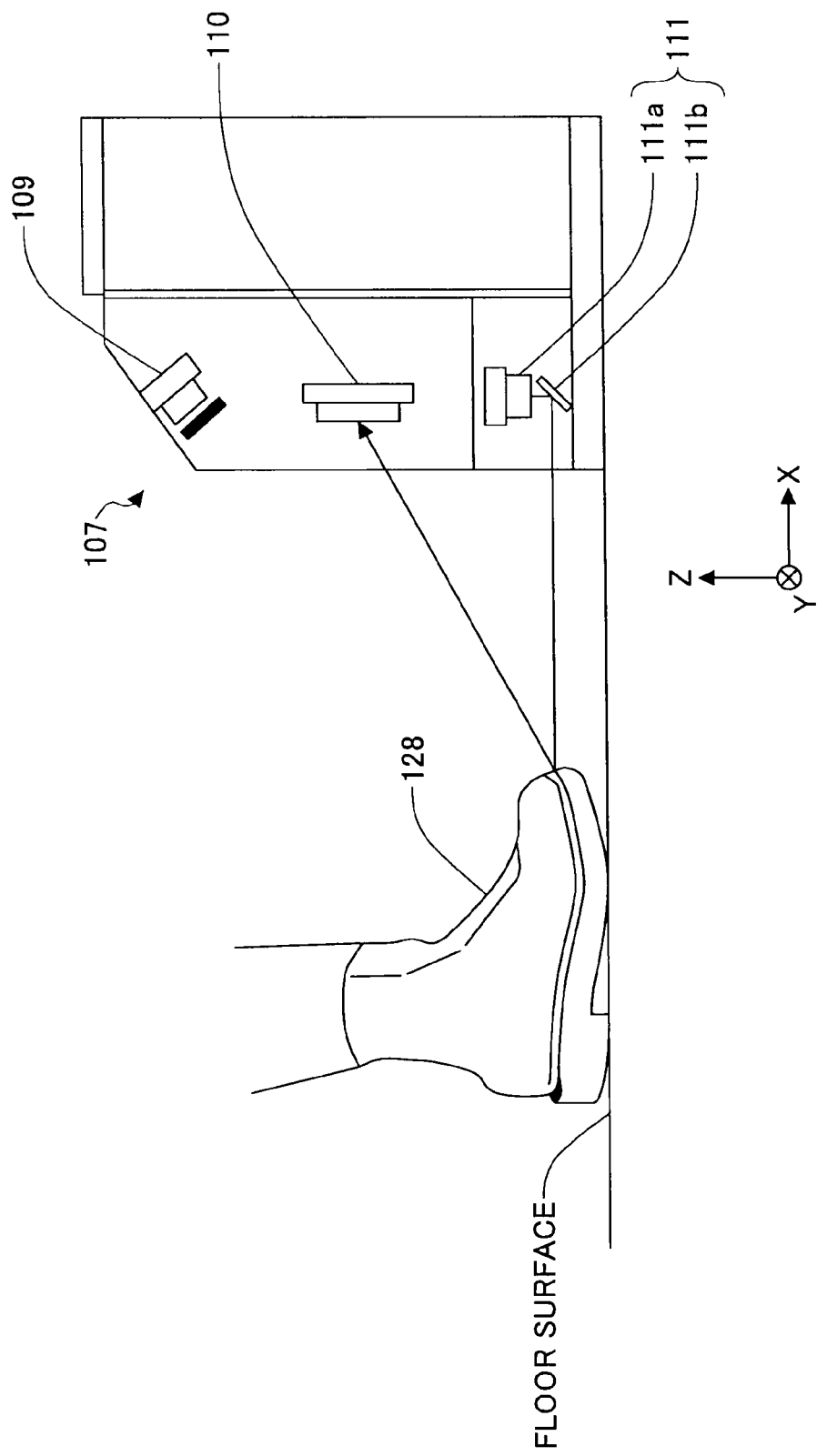
FIG. 9 is a diagram for explaining working of the CMOS camera.

The CMOS camera 110 is placed between the projection apparatus 109 and the infrared apparatus 111. For example, as shown in FIG. 9, when the foot 128 of the user is placed in the projection area on the floor surface, infrared light reflected on the foot 128 enters the CMOS camera 110. When the CMOS camera 110 receives the infrared light, the CMOS camera 110 outputs a signal including information corresponding to the position of the foot 128. The output signal of the CMOS camera 110 is provided to the input unit control apparatus 116.

Figure 10:
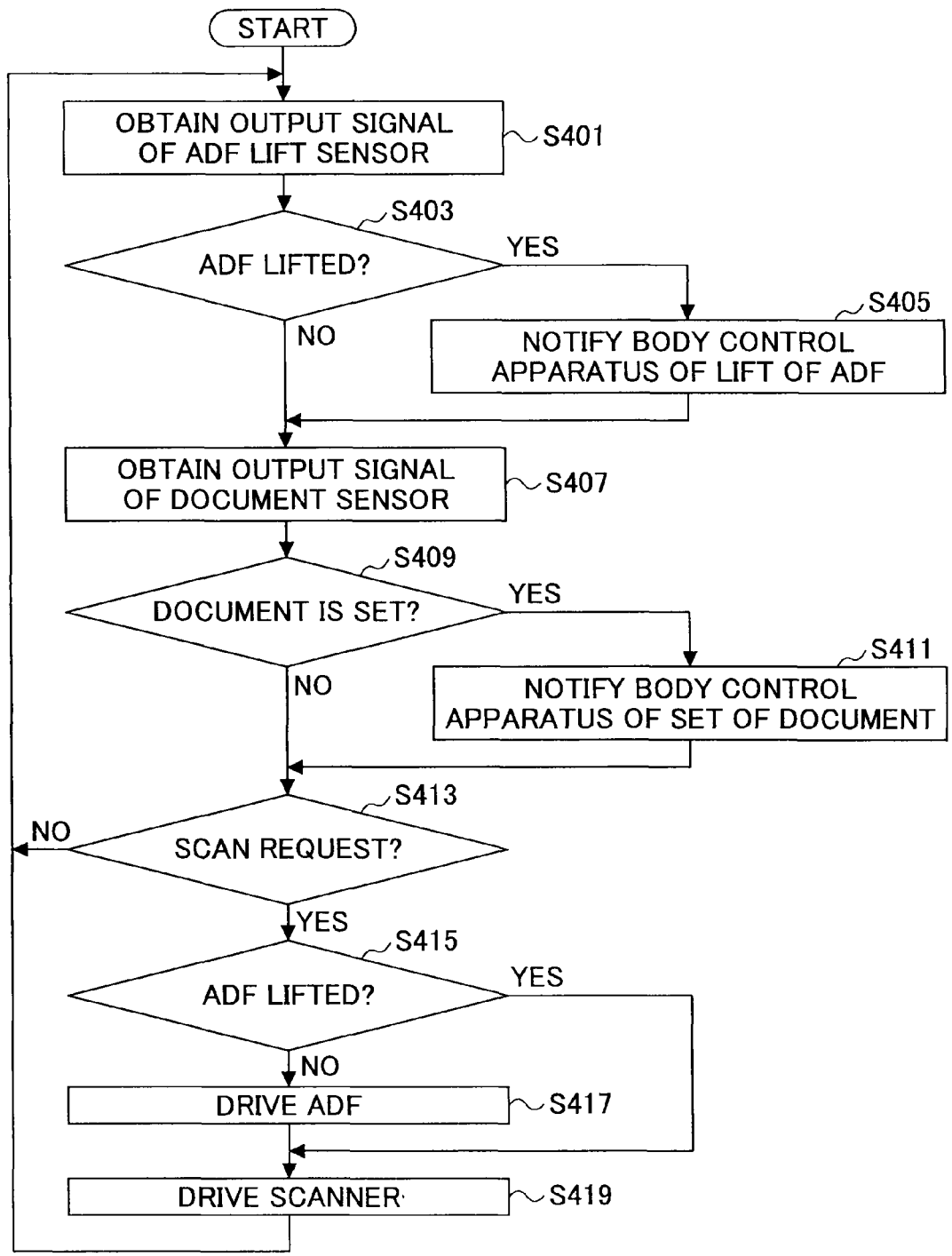
FIG. 10 is a flowchart for explaining operation of the ADF/scanner unit control apparatus.

The ADF/scanner unit control apparatus 120 includes a CPU 120a and a memory 120b which stores a program and various types of data. The program is written by code that can be interpreted by the CPU 120a. Operation of the ADF/scanner unit control apparatus 120 is described using the flowchart shown in FIG. 10. FIG. 10 corresponds to a series of processing algorism executed by the CPU 120a.

When the power is turned on, a start address of the program corresponds to the flowchart of FIG. 10 is set to a program counter of the CPU 120a, so that processing starts.

In this embodiment, communication with the body control apparatus 115 is performed by interrupt processing for both of receiving and sending (receive interrupt processing and send interrupt processing). When receiving a notification from the body control apparatus 115, a corresponding receive flag is set in the receive interrupt processing.

In the first step S401, an output signal of the ADF lift sensor is obtained.

In next step S403, it is determined whether the ADF 101 is lifted by the user based on the output signal of the ADF lift sensor 121. If the ADF lift sensor 121 is in a state of "lift detected", the result of the determination becomes YES, and the process goes to step S405.

In step S405, the ADF/scanner unit control apparatus 120 notifies the body control apparatus 115 that the ADF 101 is lifted, and the process goes to step S407.

In step S407, an output signal of the document sensor 122 is obtained.

In the next step S409, it is determined whether the document is set on the document setting unit of the ADF 101 based on the output signal of the document sensor 122. When the document sensor 122 is in a state of "set detected", it is determined that the document is set on the document setting unit, and the process goes to step S411.

In step S411, information indicating that "the document is set" is reported to the body control apparatus 115, and the process goes to step S413.

In step S413, the receive flag is referred to, so that it is determined whether "scan request" is received from the body control apparatus 115. If the "scan request" is received from the body control apparatus 115, the result of the determination becomes YES, and the process goes to step S415. The receive flag of "scan request" from the body control apparatus 115 is reset at this time.

In step S415, it is determined whether the ADF 101 is lifted by the user based on the output signal of the ADF lift sensor. If the ADF lift sensor 121 is in a state of "lift not detected", the result of the determination becomes NO, and the process goes to step S417.

In step S417, the ADf 101 is instructed to start to operate. Accordingly, the document set on the document setting unit is carried to the upper surface (glass surface) of the scanner 103. When there are a plurality of documents, after the scanner 103 reads a previously carried document, a next document is carried to the scanner 103.

In the next step S419, the scanner 103 is instructed to start operation. Accordingly, image information of the document set on the upper surface (glass surface) is read. Then, after all of the documents are read, the process returns to step S401.

In step S403, if the ADF lift sensor 121 is in a state of "lift not detected", the result of the determination in step S403 becomes NO, and the process goes to step S407.

In step S409, if the document sensor 122 is in a state of "setting not detected", the result of the determination in step S409 becomes NO, and the process goes to step S413.

In step S413, if "scan request" is not received from the body control apparatus 115, the result of the determination in step S413 becomes NO, and the process returns to step S401.

In step S415, if the ADF lift sensor 121 is in a state of "lift detected", the result of the determination in step S415 becomes YES, and the process goes to step S419.

Figure 11:
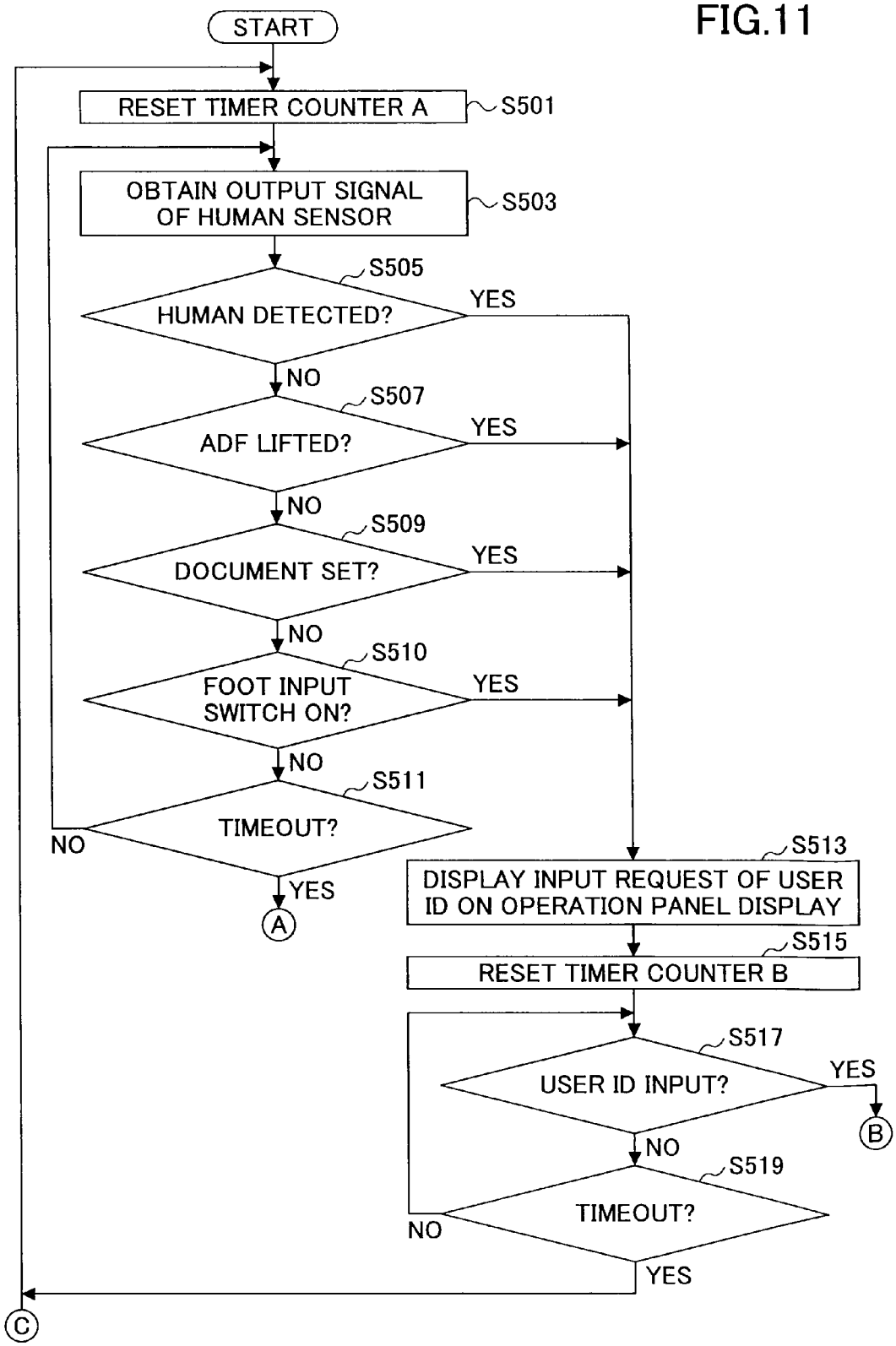
FIG. 11 is a flowchart (1) for explaining "operation on key input" in the body control apparatus.
Figure 12:
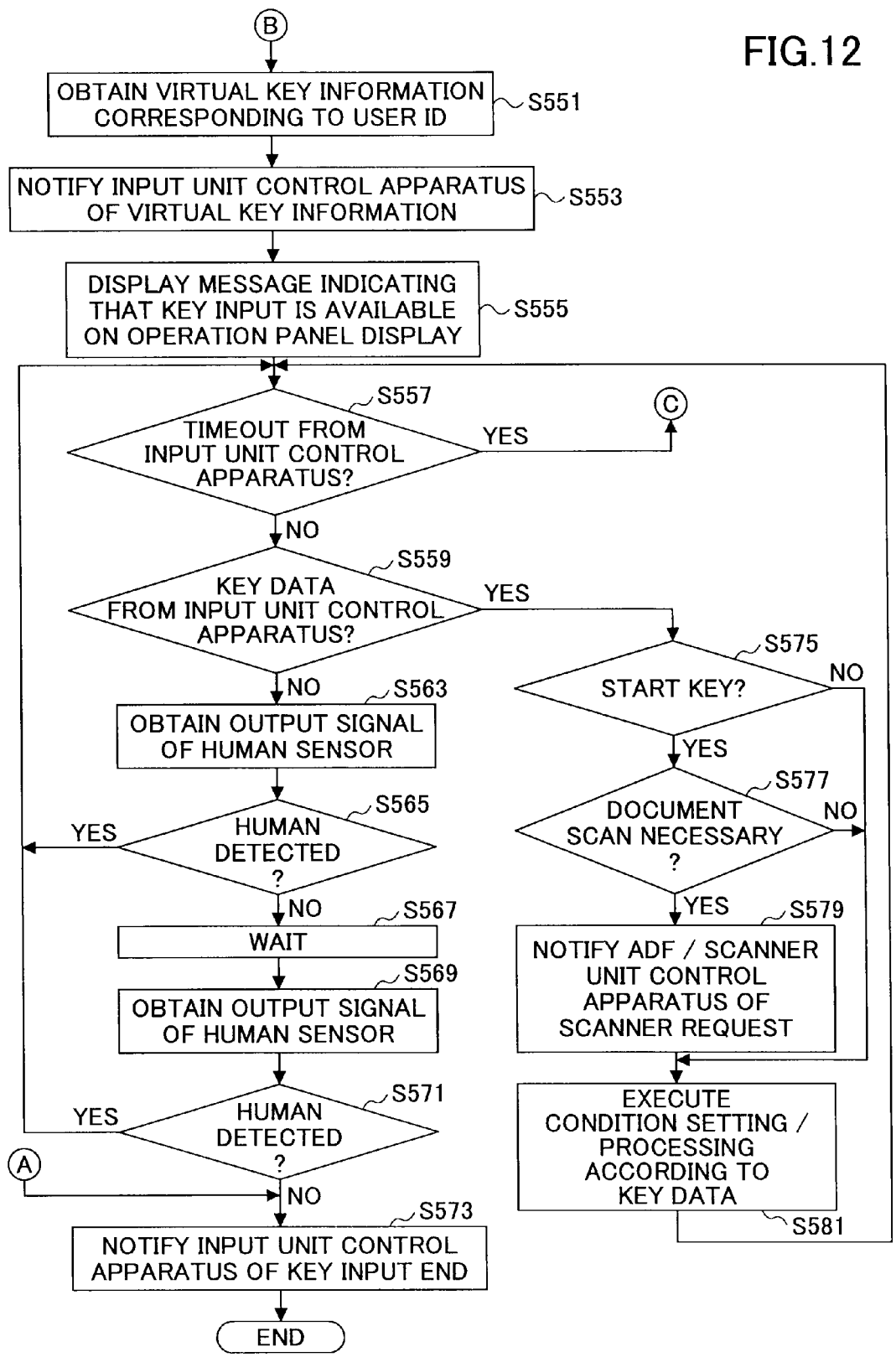
FIG. 12 is a flowchart (2) for explaining "operation on key input" in the body control apparatus.

The body control apparatus 115 includes a CPU 115a and a memory 115b which stores a program and various types of data. The program is written by code that can be interpreted by the CPU 115a. Operation on key input of the body control apparatus 115 is described using the flowcharts shown in FIGS. 11 and 12. FIGS. 11 and 12 correspond to a series of processing algorism executed by the CPU 115a in the operation on key input processing.

When the power is turned on, a start address of the program stored in the memory 115b is set to a program counter of the CPU 115a, so that processing of the body control apparatus 115 starts. Then, when the operation on key inputs is requested, a program (subroutine or module) corresponding to the flowcharts of FIGS. 11 and 12 is called.

In this embodiment, communication with the input unit control apparatus 116, the ADF/scanner unit control apparatus 120 and the ID reading apparatus 123 is performed by interrupt processing for both of receiving and sending (receive interrupt processing and send interrupt processing).

When receiving a notification from any of the input unit control apparatus 116, the ADF/scanner unit control apparatus 120 and the ID reading apparatus 123, corresponding receive flag is set in the receive interrupt processing.

In the first step S501, a timer counter A is reset. This timer counter A is configured to be count up by timer interrupt processing.

In the next step S503, an output signal from the human sensor 114 is obtained.

In the next step S505, it is determined whether the human sensor detects a human based on the output signal of the human sensor 114. When the human sensor 114 is in a state of "not detected", the result of the determination becomes NO, and the process goes to step S507.

In step S507, the receive flag is referred to, so that it is determined whether the ADF 101 is lifted. If there is no notification of "ADF 101 is lifted" from the ADF/scanner unit control apparatus 120, the result of the determination becomes NO, and the process goes to step S509.

In step S509, the receive flag is referred to, so that it is determined whether a document is set on the document setting unit of the ADF 101. If there is no notification of "document has been set" from the ADF/scanner unit control apparatus 120, the result of the determination becomes NO, and the process goes to step S510.

In step S510, it is determined whether the foot input switch is in an on-state. If the foot input switch is not in the on-state, the result of the determination becomes NO, and the process goes to step S511.

In step S511, the timer counter A is referred to, so that it is determined whether timeout occurs. If the value of the timer counter A is equal to or less than a predetermined value, the result of the determination becomes NO, and the process returns to step S503.

On the other hand, in step S505, if the human sensor 114 is in a state of "detected", the result of the determination in step S505 becomes YES, and the process goes to step S513.

In addition, in step S507, if there is a notification of "ADF 101 is lifted" from the ADF/scanner unit control apparatus, the result of the determination in step S507 becomes Yes, and the process goes to step S513. The receive flag of the notification of "ADF 101 is lifted" is reset at this time.

In step S509, if there is a notification of "document has been set" from the ADF/scanner unit control apparatus 120, the result of the determination in step S509 becomes Yes, and the process goes to step S513. The receive flag of the notification of "document has been set" is reset at this time.

In step S510, if the foot input switch 131 is in the on-state, the result of the determination in step S510 becomes YES, and the process goes to step S513.

In step S513, the operation panel display 102 is caused to display a message for requesting input of a user ID.

In the next step S515, the timer counter B is reset. The timer counter B is configured to count up by timer interrupt processing.

In the next step S517, the receive flag is referred to, so that it is determined whether a user ID is input. If there is no notification of a user ID from the ID reading apparatus 123, the result of the determination becomes NO, and the process goes to step S519.

In the step S519, the timer counter B is referred to, so that it is determined whether timeout occurs. If the value of the timer counter B is equal to or less than a predetermined value, the result of the determination becomes NO, and the process returns to step S517. On the other hand, if the value of the timer counter B exceeds the predetermined value, the result of the determination becomes YES, and the process returns to step S501.

In step S517, if there is the notification of the user ID from the ID reading apparatus 123, the result of the determination in step S517 becomes YES, and the process goes to step S551, The receive flag of the notification of the user ID is reset at this time.

In step S551, user information stored in the memory 124 is referred to, and virtual key information corresponding to the notified user ID is obtained. In this process, a virtual key number is obtained as the virtual key information. The virtual key number specifies types of virtual keys, locations of virtual keys, sizes and colors of each virtual key, and the size of the projection area.

In the next step S553, the obtained virtual key information is sent to the input unit control apparatus 116.

In the next step S555, the operation panel display 102 is caused to display a message indicating that key input is available.

In the next step S557, it is determined whether there is a notification of "timeout" from the input unit control apparatus 116. If there is no notification of "timeout" from the input unit control apparatus 116, the result of the determination becomes NO, and the process goes to step S559.

In step S559, it is determined whether there is a notification of "key data" from the input unit control apparatus 116. If there is no notification of "key data" from the input unit control apparatus 116, the result of the determination becomes NO, and the process goes to step S563.

In step S563, an output signal of the human sensor 114 is obtained.

In the next step S565, it is determined whether the human sensor 111 detects a human based on the output signal of the human sensor 114. If the human sensor 114 is in a state of "not detected", the result of the determination becomes NO, and the process goes to step S567.

In this step S567, the system waits for a predetermined time. In the next step S569, an output signal of the human sensor 114 is obtained again.

In the next step S571, it is determined whether the human sensor 111 detects a human based on the output signal of the human sensor 114. If the human sensor 114 is in a state of "not detected", the result of the determination becomes NO, and the process goes to step S573.

In step S573, it is determined that key input by the user completes, so that "end of key input" is reported to the input unit control apparatus 116. Then, "operation on key input" ends, and the system goes to another processing or operation.

In step S511, if the value of the timer counter A exceeds a predetermined value, the result of the determination in step S511 becomes YES, and the process goes to step S573.

In step S557, if there is a notification of "timeout" from the input unit control apparatus 116, the result of the determination in step S557 becomes YES, and the process returns to step S501. The receive flag of the notification of "timeout" is reset at this time.

In step S565, if the human sensor 114 is in a state of "detected", the result of determination in step S565 becomes YES, and the process returns to step S557.

In the same way, in step S571, if the human sensor 114 is in a state of "detected", the result of determination in step S571 becomes YES, and the process returns to step S557.

In step S559, if there is a notification of "key data" from the input unit control apparatus 116, the result of the determination in step S559 becomes YES, and the process goes to step S575. The receive flag of the notification of "key data" is reset at this time.

In step S575, it is determined whether the key data is the "Start" key. When the key data is the "Start" key, the result of the determination becomes YES, and the process goes to step S577.

In step S577, it is determined whether it is necessary to scan a document. For example, when the multifunction machine 100 is set to function as a copy machine or a scanner machine, the result of the determination becomes YES, and the process goes to step S579.

In step S579, "scan request" is sent to the ADF/scanner unit control apparatus 120.

In next step S581, condition is set according to the key data, or processing is performed according to the key data. Then, the process returns to step S557.

On the other hand, in step S575, if the key data is not the "Start" key, the result of the determination in step S575 becomes NO, and the process goes to step S581. At this time, in step S581, when the key data is the "Copy" key, the multifunction machine 100 is set to operate as a copy machine. When the key data is the "Scanner" key, the multifunction machine 100 is set to operate as a scanner machine. Further, when the key data is the "Printer" key, the multifunction machine 100 is set to operate as a printer machine.

In step S577, for example, when the multifunction machine 100 is set to operate as a printer machine, the result of the determination in step S577 becomes NO, and the process goes to step S581.

Figure 13:
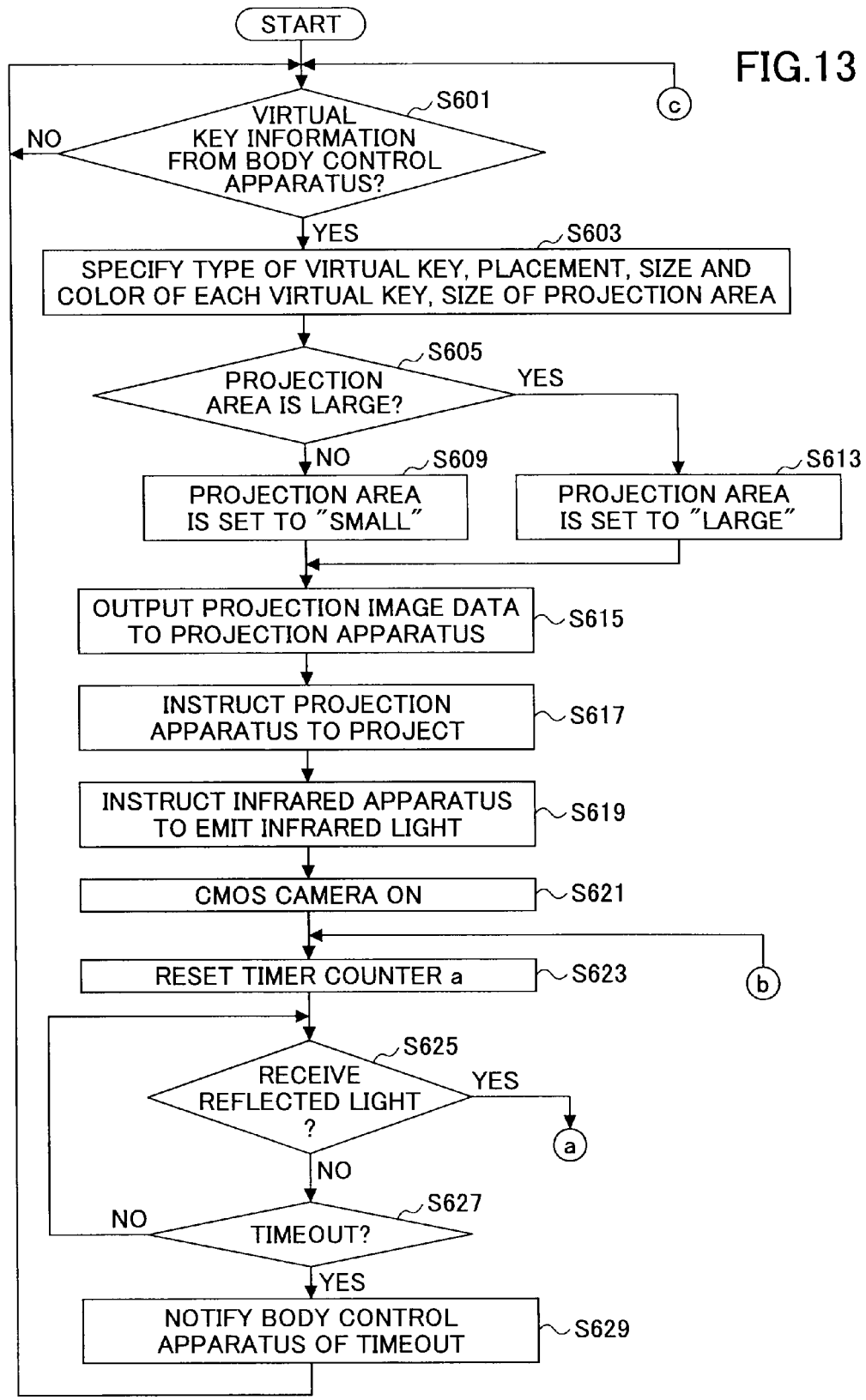
FIG. 13 is a flowchart (1) for explaining operation of the input unit control apparatus.
Figure 14:
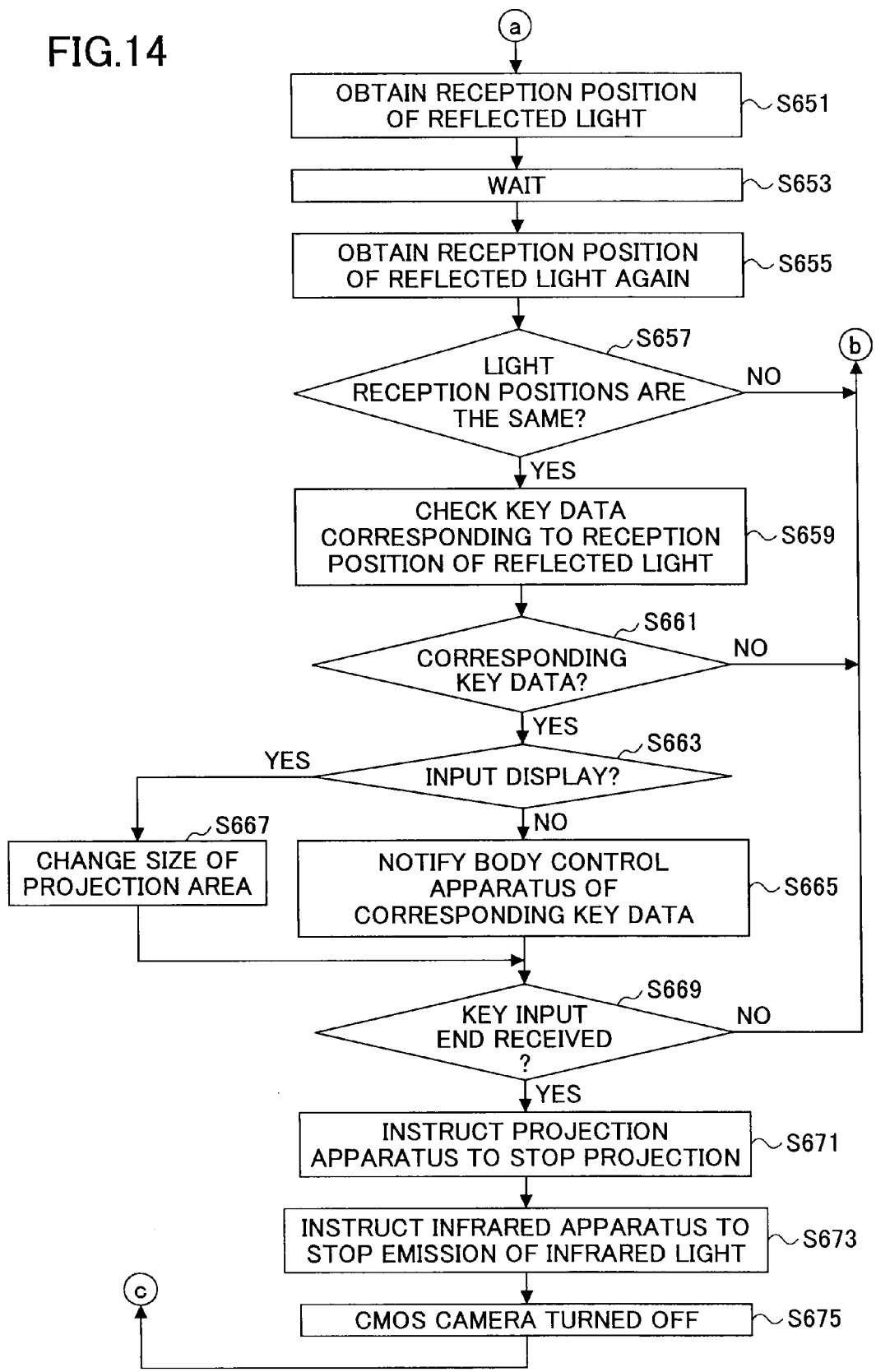
FIG. 14 is a flowchart (2) for explaining operation of the input unit control apparatus.

The input unit control apparatus 116 includes a CPU 116a and a memory 116b which stores a program and various types of data. The program is written by code that can be interpreted by the CPU 116a. Operation of the input unit control apparatus 116 is described using the flowcharts shown in FIGS. 13 and 14. FIGS. 13 and 14 correspond to a series of processing algorism executed by the CPU of the input unit control apparatus 116.

When the power is turned on, a start address of the program stored in the memory 116b corresponding to the flowcharts of FIGS. 13 and 14 is set to a program counter of the CPU 116a, so that processing starts.

In this embodiment, communication with the body control apparatus 115 is performed by interrupt processing for both of receiving and sending (receive interrupt processing and send interrupt processing). When receiving a notification from the body control apparatus 115, corresponding receive flag is set in the receive interrupt processing.

In the first step S601, the receive flag is referred to, so that it is determined whether there is a notification of "virtual key information" from the body control apparatus 115. When there is the notification of "virtual key information" from the body control apparatus 115, the result of the determination becomes YES, and the process goes to step S603. The receive flag of notification of "virtual key information" is reset at this time.

In step S603, the input unit control apparatus 116 specifies types and placement of virtual keys, sizes and colors of each virtual key, and the size of projection area. In this example, the memory 116b stores beforehand projection data including the types of virtual keys, placement of virtual keys, size and color of each virtual key, and the size of projection area for each virtual key number, so that projection data can be searched and retrieved using the virtual key number.

In step S605, it is determined whether the size of the projection area is large. IF the size of the projection area is not large, the result of the determination becomes NO, and the process goes to step S609.

In step S609, the input unit control apparatus 116 instructs the projection apparatus 109 to set the size of the projection area to be small.

In the next step S615, projection image data is output to the projection apparatus 109 based on the projection data. In the present embodiment, as an example, the projection apparatus 109 is set such that function setting key, numeric keypad, operation key, and other key are projected by using different colors with each other.

Figure 15:
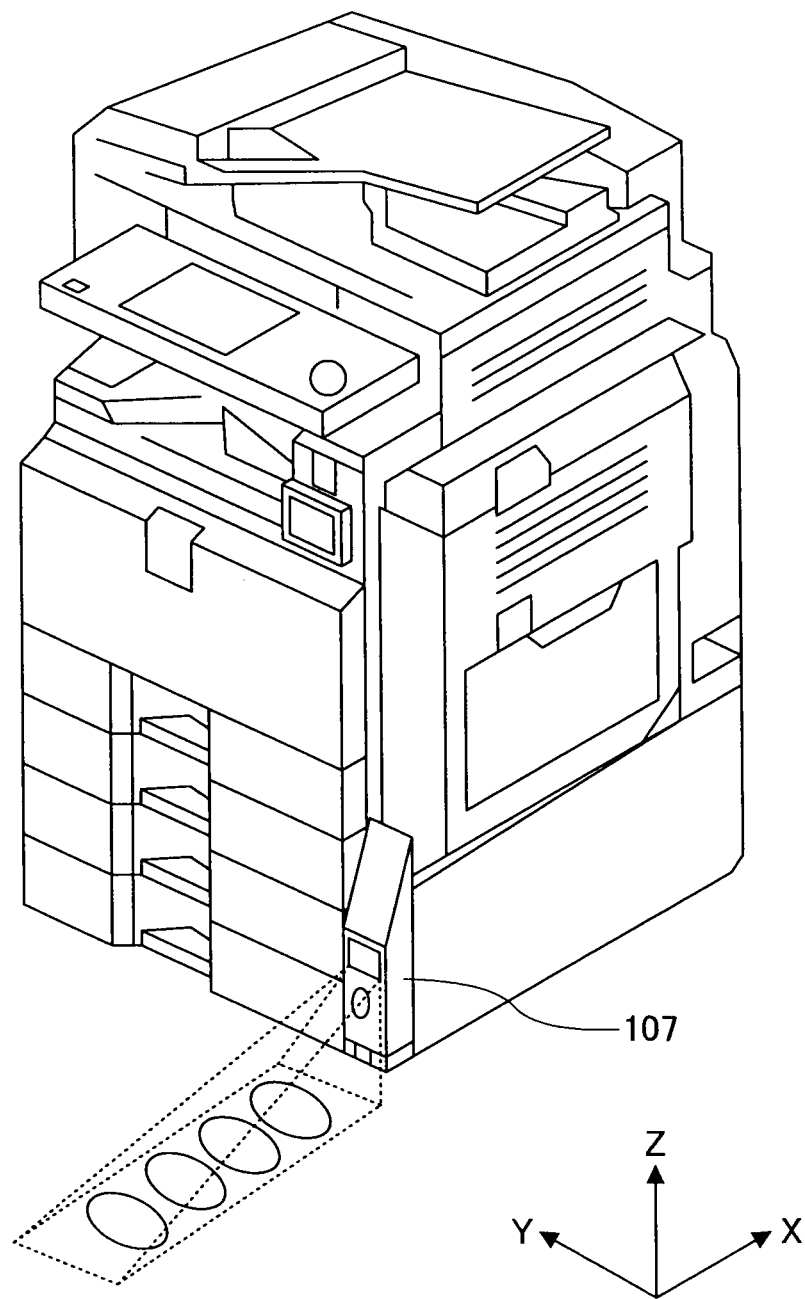
FIG. 15 is a diagram (1) for explaining operation of the input unit control apparatus.

In the next step S617, the projection apparatus 109 is instructed to perform projection. In this embodiment, as an example, a virtual key image is projected on the floor surface as shown in FIG. 15.

In the next step S619, the infrared apparatus 111 is instructed to output infrared light.

In the next step S621, the CMOS camera 110 is turned on. At this time, the key decision flag is reset.

In the next step S623, the timer counter a is reset. The timer counter a is configured to be count up by timer interrupt processing.

In the next step S625, it is determined whether the CMOS camera has received reflected light of the infrared light based on the output signal of the CMOS camera 110. When the CMOS camera 110 has not received the reflected light of the infrared light, the result of the determination becomes NO, and the process goes to step S627.

In step S627, the timer counter a is referred to, and it is determined whether timeout occurs. If the value of the timer counter a is equal to or less than a predetermined value, the result of the determination becomes NO, and the process returns to step S625. On the other hand, when the value of the timer counter a exceeds the predetermined value, the result of the determination becomes YES, and the process goes to step S629.

In step S629, "timeout" is reported to the body control apparatus 115. Then, the process returns to step S601.

In step S601, if "virtual key information" is not reported from the body control apparatus 115, the result of the determination in step S601 becomes NO, and the system waits until the "virtual key information" is reported from the body control apparatus 115.

In step S605, when the size of the projection area is large, the result of the determination in step S605 becomes YES, and the process goes to step S613.

Figure 16:
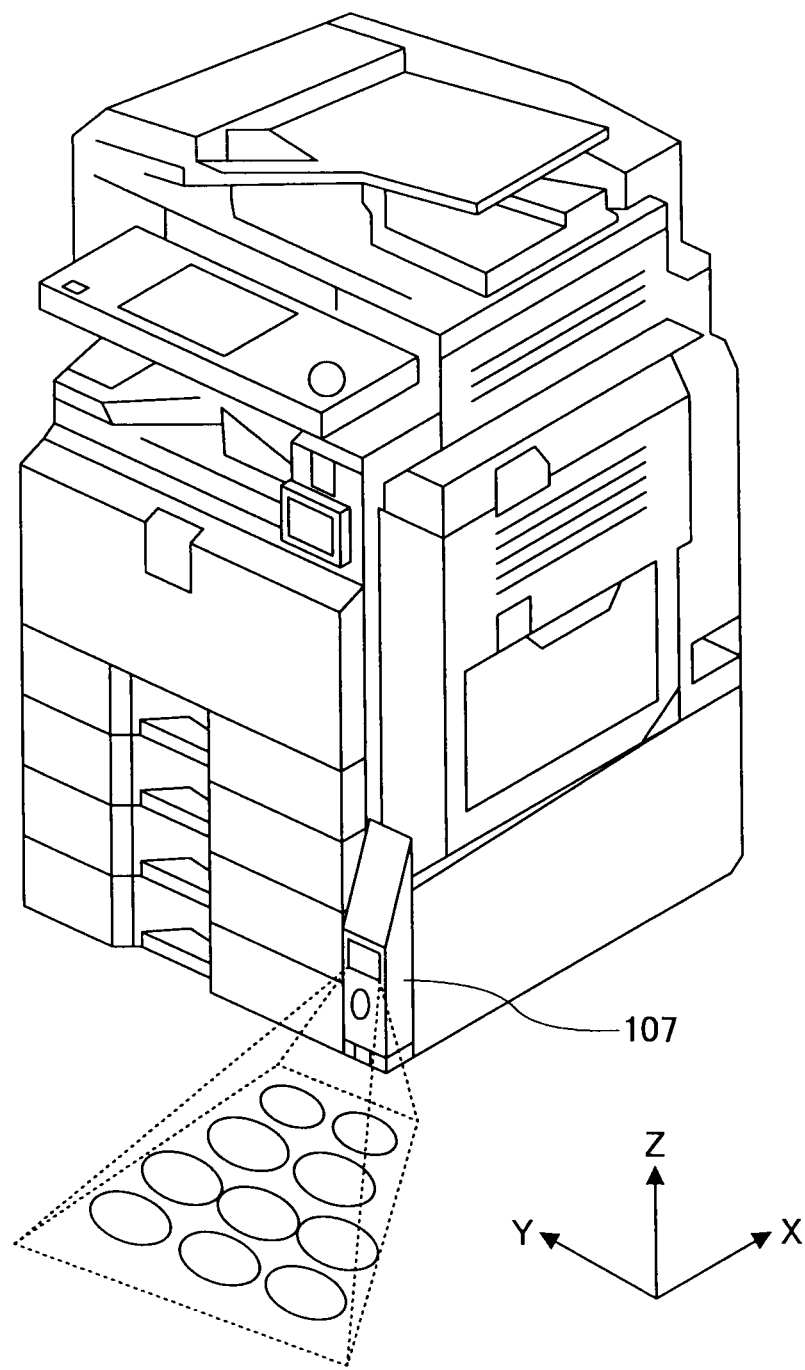
FIG. 16 is a diagram (2) for explaining operation of the input unit control apparatus.
Figure 17:
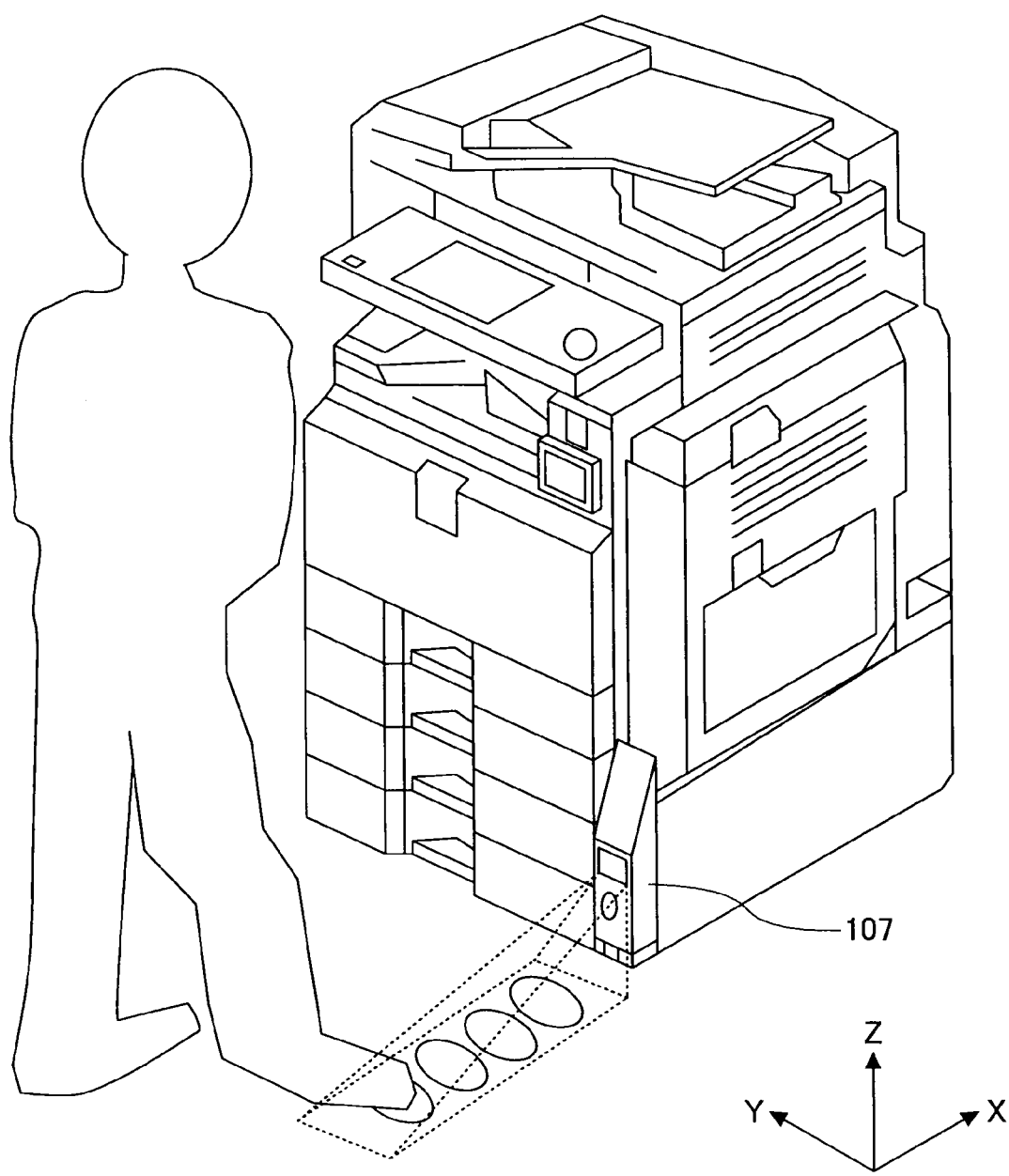
FIG. 17 is a diagram (3) for explaining operation of the input unit control apparatus.
Figure 18:
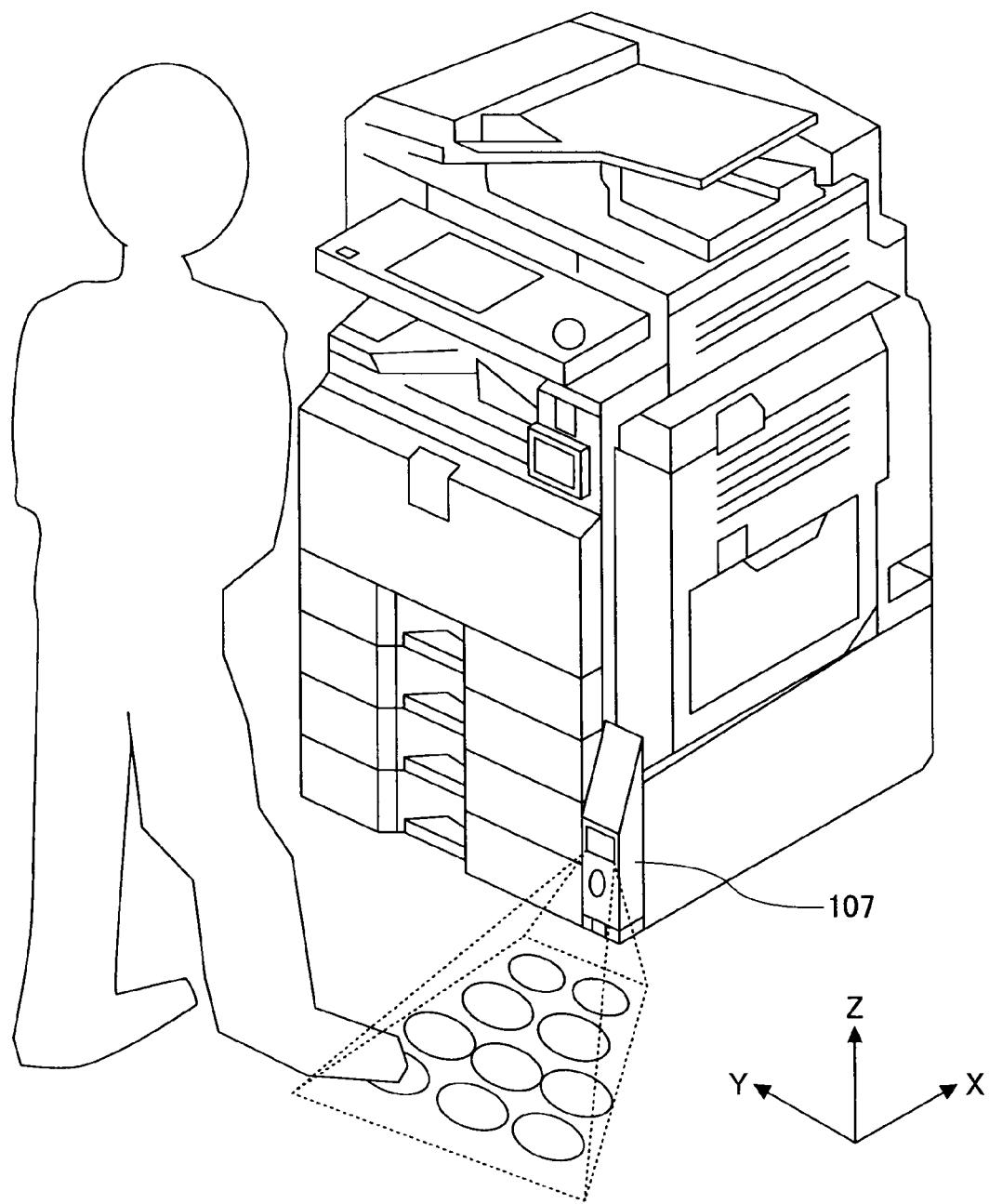
FIG. 18 is a diagram (4) for explaining operation of the input unit control apparatus.

In step S613, the size of the projection area is set to be large. Then, the process goes to step S615. At this time, in step S617, as shown in FIG. 16 as an example, the virtual key image is projected on the floor surface.

In addition, in step S625, if the CMOS camera receives the reflected light of the infrared light, the result of the determination in step S625 becomes YES, and the process goes to step S651.

In step S651, a light reception position of the reflected light in the CMOS camera 110 is obtained based on the output signal of the CMOS camera 110.

In the next step S653, the system waits for a predetermined time.

In the next step S655, a light reception position of the reflected light in the CMOS camera 110 is obtained based on the output signal of the CMOS camera 110 again.

In the next step S657, it is determined whether the light reception position of the reflected light obtained in step S651 is the same as the light reception position of the reflection light obtained in step S655. When they are the same, the result of the determination becomes YES, and the process goes to step S659. In the determination, the positions are regarded to be the same when the difference between them falls within a predetermined range.

In step S659, projection data is referred to, so that key data corresponding to the light reception position of the reflected light is checked. Relationship between the light reception position in the CMOS camera 110 and the position of the foot on the floor surface has been obtained by various preliminary experiments beforehand, and the information of the relationship is stored in the memory 116b. Therefore, the position of the foot on the floor surface can be ascertained based on the light reception position of the reflected light in the CMOS camera 110 (refer to FIGS. 17 and 18). Then, based on the position of the foot on the floor and the projection data, a type of a virtual key projected on the position of the foot can be ascertained.

In the next step S661, it is determined whether there is key data corresponding to the light reception position of the reflected light. When there is key data corresponding to the light reception position of the reflected light, the result of the determination becomes YES, and the process goes to step S663.

In step S663, it is determined whether the key data corresponding to the light reception position of the reflected light is "Input Display". If the key data corresponding to the light reception position of the reflected light is not the "Input Display", the result of the determination becomes NO, and the process goes to step S665.

In step S665, if the key decision flag is in a reset state, "key data" corresponding to the light reception position of the reflected light is reported to the body control apparatus 115. Then, the key decision flag is set.

In the next step S669, the receive flag is referred to, so that it is determined whether "completion of key input" is reported from the body control apparatus 115. If there is no notification of "completion of key input", the result of the determination becomes NO, and the process returns to step S623.

In step S657, when the light reception positions are different with each other, the result of the determination in step S657 becomes NO, and the process returns to step S623. At this time, the key decision flag is reset.

In step S661, if there is no key data corresponding to the light reception position of the reflection light, the result of the determination in step S661 becomes NO, and the process returns to step S623. At this time, the key decision flag is reset.

In step S663, if the key data corresponding to the light reception position of the reflection light is "Input Display", the result of the determination in step S663 becomes YES, and the process goes to step S667.

In step S667, the projection apparatus 109 is instructed to change the size of the projection area. Accompanying this, the virtual keys projected on the floor surface are also changed. Then, the process goes to step S669.

In step S669, if there is a notification of the "end of key input", the result of the determination in step S669 becomes YES, and the process goes to step S671. The receive flag of the notification of "end of key input" is reset at this time.

In step S671, the projection apparatus 109 is instructed to stop projection. In the next step S673, the infrared apparatus 111 is instructed to stop emitting the infrared light.

In the next step S675, the CMOS camera 110 is turned OFF. Then, the process returns to step S601.

As is clear from above explanation, in the multifunction machine 100 of the present embodiment, the input apparatus is configured by the input unit 107 and the ID reading apparatus 123. The position detection apparatus is configured by the infrared apparatus 111, the CMOS camera 110 and the input unit control apparatus 116. In addition, the key detection apparatus is configured by the input unit control apparatus 116. The user information input unit is configured by the ID reading apparatus 123.

As described above, the multifunction machine 100 of the present embodiment includes: the projection apparatus 109 for projecting a plurality of virtual key images on the floor surface; the infrared apparatus 111 for emitting infrared light near the area on which the virtual key images are projected; the CMOS camera 110 for receiving infrared light reflected on the foot of the user that is put on the floor surface and outputting a signal including position information of the foot of the user on the floor surface; and an input unit control apparatus 116 for detecting a virtual key corresponding to a position of the foot of the user from among a plurality of virtual keys based on information on the virtual key images and the output signal of the CMOS camera 110.

By this configuration, the user can input an instruction into the body of the multifunction machine without using mechanical structure part like a conventional way. Thus, durability can be improved. In addition, input can be performed using only the foot, it becomes possible to leave both hands to be free when inputting the instruction. In addition, since a plurality of virtual key images are projected according to functions of the multifunction machine, operability can be improved.

In addition, since the size of the projection area can be changed as necessary, operability can be further improved.

In addition, the function setting key, numerical keypad, the operation key and other keys are projected using different colors with each other, error input can be avoided, so that operability can be further improved.

In the above-mentioned embodiment, the "operation on key input" starts in the body control apparatus 115 when the user stands in front of the multifunction machine 100, when the user sets a document or performs preliminary operation for setting the document, or when the foot input switch becomes in an ON state. Thus, the input unit 107 can cause the projection apparatus 109, the CMOS camera 110 and the infrared apparatus 111 to operate only when it is necessary. Therefore, energy-saving can be realized.

In addition, in the embodiment, since a plurality of virtual keys are projected according to the user ID, operability can be further improved.

In the present embodiment, at least a part of processes executed in the input unit control apparatus 116 can be executed by hardware.

In addition, in the present embodiment, at least a part of the "operation on key input" executed by the body control apparatus 115 may be executed by the input unit control apparatus 116. For example, a process for obtaining virtual key information corresponding to the user ID may be performed by the input unit control apparatus 116.

In addition, in the present embodiment, at least a part of "operation on key input" executed by the body control apparatus 115 may be executed by hardware.

In addition, in the present embodiment, at least a part of processes executed by the ADF/scanner unit control apparatus 120 may be executed by the body control apparatus 115.

In addition, in the present embodiment, at least a part of processes executed by the ADF/scanner unit control apparatus 120 may be executed by hardware.

Although there are two types of sizes for the projection area in the present embodiment, the present invention is not limited to that. There may be equal to or more than three types of sizes for the projection area.

In addition, although the present embodiment describes a case in which virtual key information (virtual key numbers) are different for each user, the present invention is not limited to that. For example, the virtual key information can be deferment for each size of the projection area.

In the present embodiment, an example is described in which the user ID is input by using the ID reading apparatus 123. But, the present invention is not limited to that. Information for specifying virtual key information may be input. For example, the virtual key number may be input using the ID reading apparatus 123.

In the present embodiment, an example is described in which the user ID is input using the ID reading apparatus 123. But, the present invention is not limited to this embodiment. For example, the user ID may be input from an upper apparatus (personal computer, for example).

In addition, in the present embodiment, an example is described in which the body control apparatus 115 goes to a next operation (step S513 in the above-mentioned embodiment) in the "operation on key input" when one of four events occurs, which are detection of human, lift of ADF, setting of document, and turn-on of the foot input switch. But, the present invention is not limited to that. The body control apparatus 115 may goes to the next operation when a human is detected, and, in addition to that when lift of ADF, setting of document, or turn-on of the foot input switch occurs.

In addition, in the present embodiment, an example is described in which the size of the projection area is changed using an iris mechanism. But, the present invention is not limited to that. For example, an iris function can be provided to the liquid crystal panel $109_4$ by adding mask data corresponding to the size of the projection area to the projection image data.

In addition, in the present embodiment, the type, placement and size of the virtual key projected on the floor surface are examples, and the present invention is not limited to those.

In addition, in the present embodiment, an example is described in which function setting key, numerical keypad, operation key, and other key are projected by different colors with each other. But, the present invention is not limited to this example. For example, the color may be changed for each virtual key.

In addition, in the present embodiment, an example is described in which the image forming apparatus is a multifunction machine. But, the present invention is not limited to this example. For example, the image forming apparatus can be a copy machine. That is, it is only necessary that the image forming apparatus of the present invention is an image forming apparatus for forming an image based on instructions input by the user.

In addition, in the present embodiment, the projection apparatus 109 may be further provided with an illumination sensor for detecting brightness near the projection area so as to change at least one of brightness of the projection image and the color of the image of the virtual key according to the detection result of the illumination sensor. Accordingly, visibility of the virtual key can be improved.

Figure 19:
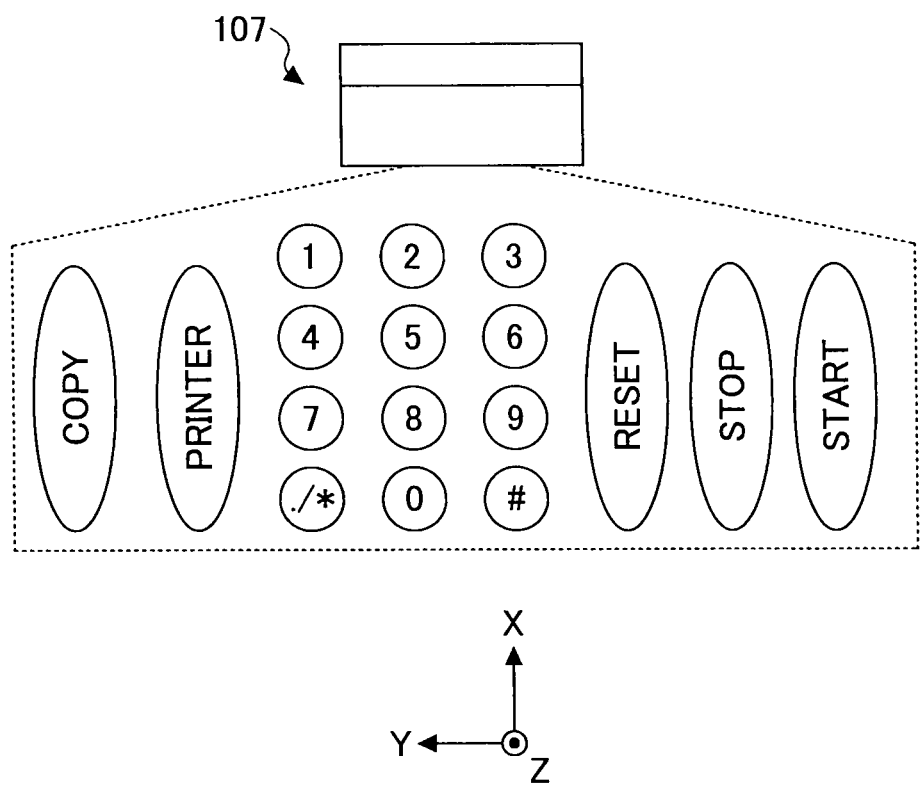
FIG. 19 is a diagram (1) for explaining a modified example of the projection area.
Figure 20:
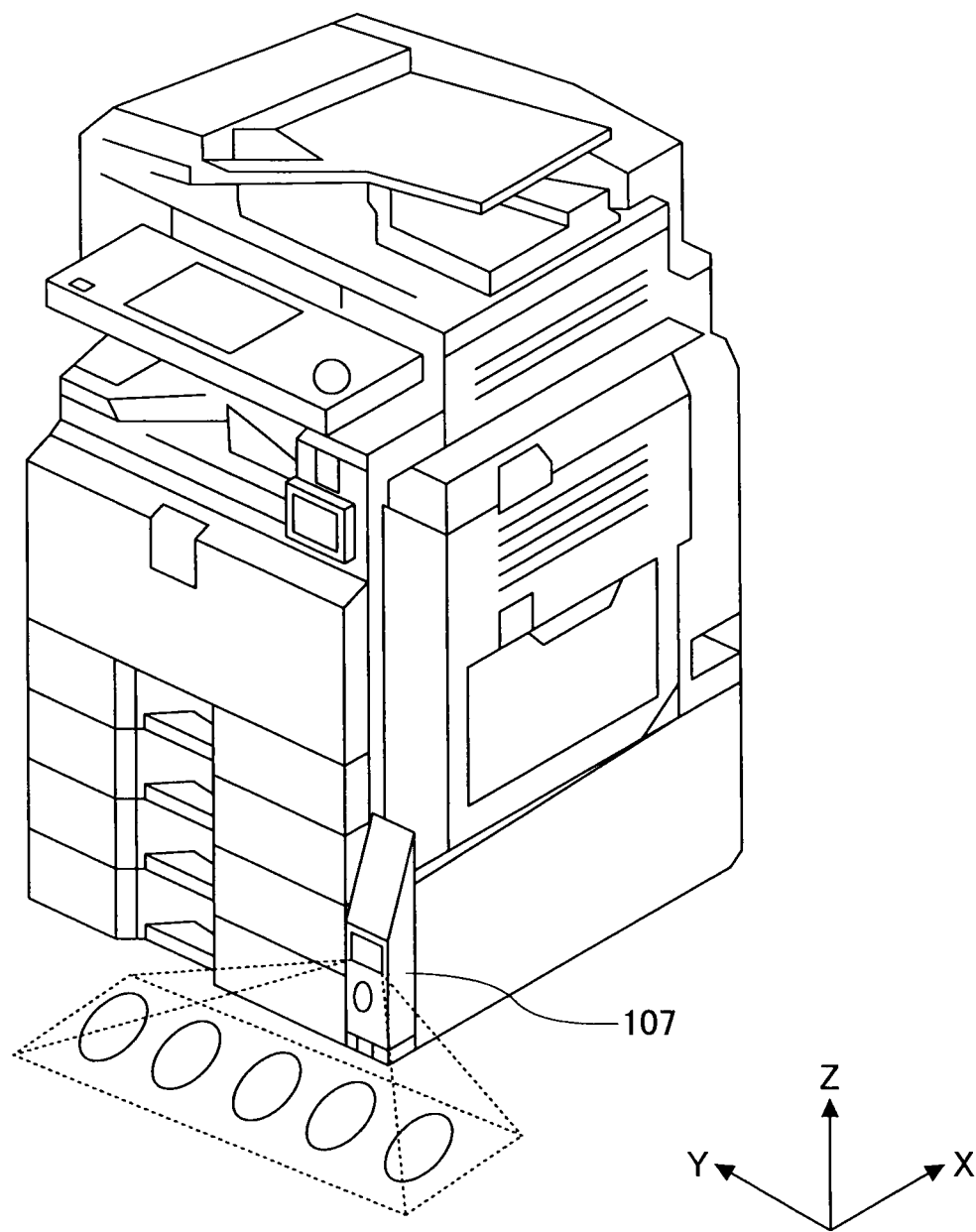
FIG. 20 is a diagram (2) for explaining a modified example of the projection area.
Figure 21:
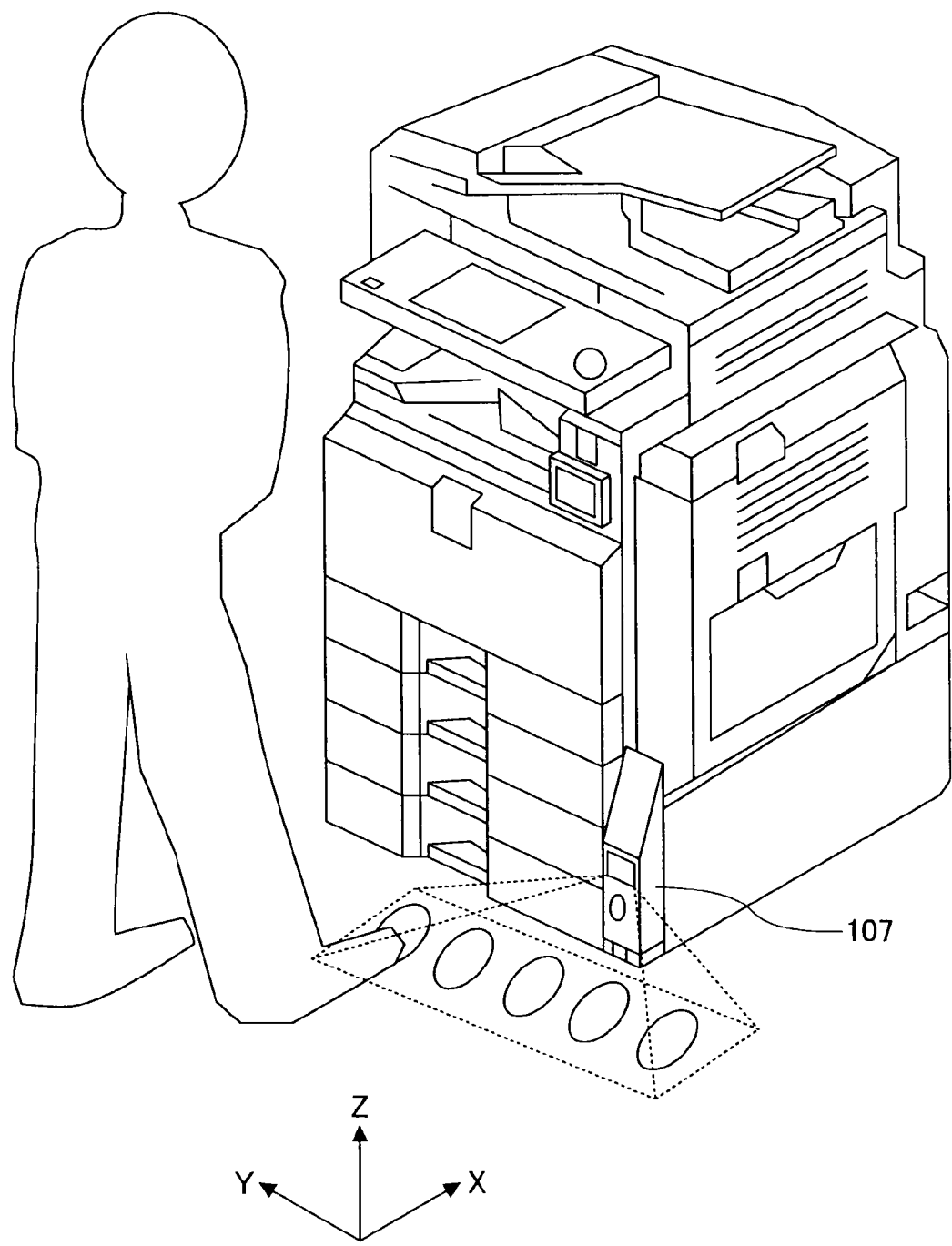
FIG. 21 is a diagram (3) for explaining a modified example of the projection area.

In addition, in the present embodiment, as shown in FIGS. 19-21, for example, the direction of the length can be the Y axis direction.

As mentioned above, the input apparatus of the embodiment of the present invention is applicable for a user to input an instruction in the machine body. In addition, the image forming apparatus of the embodiment of the present invention is applicable for forming an image based on an instruction input by the user.

The present invention is not limited to the specifically disclosed embodiments, and variations and modifications may be made without departing from the scope of the present invention.

The present application contains subject matter related to Japanese patent application No. 2008-158740, filed in the JPO on Jun. 18, 2008, the entire contents of which being incorporated herein by reference.

What is claimed is:

1. An input apparatus for a user to input an instruction into a body apparatus, comprising:
a projection unit configured to project images of a plurality of virtual keys onto a projection area on a floor surface;
a position detection unit configured to detect position information of a foot of the user put on the projection area; and
a key detection unit configured to detect a virtual key corresponding to a position of the foot of the user from among the virtual keys based on information on the images of the virtual keys and a result of detection by the position detection unit, wherein
the projection unit changes the size of the projection area on the floor surface according to an instruction by the user,
the virtual keys include function control keys for controlling functions of the input apparatus, and
the projection unit changes the function control keys that are projected in response to a change of the size of the projection area.

2. The input apparatus as claimed in claim 1, the position detection unit comprising:
an infrared unit configured to output infrared light that includes a virtual surface and that widens like a plane, wherein the virtual surface is above the floor surface and is parallel to the projection area on the floor surface; and
a camera configured to receive the infrared light reflected by the foot of the user placed in the projection area on the floor surface, and to output a signal including position information of the foot of the user in the projection area.

3. The input apparatus as claimed in claim 1, wherein the projection unit projects the images of the virtual keys that correspond to information for specifying the user.

4. The input apparatus as claimed in claim 3, wherein the key detection unit obtains information on the images of the virtual keys from the information for specifying the user.

5. The input apparatus as claimed in claim 3, further comprising a user information input unit to which the information for specifying the user is input.

6. The input apparatus as claimed in claim 1, wherein the projection unit projects the images of the virtual keys by using at least two colors.

7. The input apparatus as claimed in claim 1, wherein the projection unit projects the images of the virtual keys by using colors that are different with each other.

8. The input apparatus as claimed in claim 1, wherein the projection unit includes an iris mechanism configured to change the size of the projection area on the floor surface.

9. The input apparatus as claimed in claim 1, wherein the projection unit adds mask data to projection image data of the virtual keys for changing the size of the projection area on the floor surface.

10. The input apparatus as claimed in claim 1, further comprising an illumination sensor for detecting brightness near the projection area on the floor surface, wherein the projection unit changes the brightness of the images of the virtual keys according to the detection result of the illumination sensor.

11. The input apparatus as claimed in claim 1, wherein the virtual keys include a virtual key for changing the size of the projection area on the floor surface.

12. The input apparatus of claim 11, further comprising:
a memory that stores, in advance, projection data that includes data for setting the size of the projection area, wherein
the projection unit uses the projection data to change the function control keys that are projected, based on a detected input from the virtual key for changing the size of the projection area on the floor surface.

13. The input apparatus of claim 1, wherein the projection unit changes a number of the function control keys that are projected in response to a change of the size of the projection area.

14. An image forming apparatus for forming an image based on an instruction input by a user, comprising:
an input apparatus; and
a body apparatus configured to form an image based on the instruction input from the input apparatus,
the input apparatus comprising:
a projection unit configured to project images of a plurality of virtual keys onto a projection area on a floor surface;
a position detection unit configured to detect position information of a foot of the user put on the projection area; and
a key detection unit configured to detect a virtual key corresponding to a position of the foot of the user from among the virtual keys based on information on the images of the virtual keys and a result of detection by the position detection unit, wherein
the projection unit changes the size of the projection area on the floor surface according to an instruction by the user,
the virtual keys include function control keys for controlling functions of the image forming apparatus, and
the projection unit changes the function control keys that are projected in response to a change of the size of the projection area.

15. The image forming apparatus as claimed in claim 14, further comprising:
a human sensor configured to detect presence or absence of a human near the input apparatus, wherein
the input apparatus starts its operation when the human sensor detects a human.

16. The image forming apparatus of claim 14, wherein the virtual keys include a virtual key for changing the size of the projection area on the floor surface.

17. The image forming apparatus of claim 16, further comprising:
a memory that stores, in advance, projection data that includes data for setting the size of the projection area, wherein
the projection unit uses the projection data to change the function control keys that are projected, based on a detected input from the virtual key for changing the size of the projection area on the floor surface.

18. The image forming apparatus of claim 14, wherein the projection unit changes a number of the function control keys that are projected in response to a change of the size of the projection area.

* * * * *